United States Patent
Naseef et al.

(10) Patent No.: US 12,297,000 B2
(45) Date of Patent: May 13, 2025

(54) AUTOMATED PROCESSING OF CONTAINER ASSEMBLY SYSTEMS AND METHODS

(71) Applicant: Berkshire Grey Operating Company, Inc., Bedford, MA (US)

(72) Inventors: Samuel Naseef, Medford, MA (US); Jeffrey Kittredge, Lexington, MA (US); Joshua Best, Cambridge, MA (US); Abhishek Kaluri, Beverly, MA (US); Emmanuel Bisse, Chelsea, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 52 days.

(21) Appl. No.: 17/966,231

(22) Filed: Oct. 14, 2022

(65) Prior Publication Data
US 2023/0118602 A1  Apr. 20, 2023

Related U.S. Application Data

(60) Provisional application No. 63/255,994, filed on Oct. 15, 2021.

(51) Int. Cl.
*B65B 43/52*  (2006.01)
*B65B 43/39*  (2006.01)
(Continued)

(52) U.S. Cl.
CPC .............. *B65B 43/52* (2013.01); *B65B 43/39* (2013.01); *B65G 1/1376* (2013.01); *B65G 17/32* (2013.01);
(Continued)

(58) Field of Classification Search
CPC ...... B65G 2201/025; B65G 2201/0261; B65G 2201/0235; B65G 2201/0258; B65G 2207/46; B65G 1/1376; B65G 35/06; B65G 17/32; B65B 39/007; B65B 39/06; B65B 39/08; B65B 39/14; B65B 39/145; B65B 43/39; B65B 43/52; B65B 43/54;
(Continued)

(56) References Cited

U.S. PATENT DOCUMENTS 1,030,320 A    6/1912  Morgan
3,990,396 A *  11/1976 Turk .................... A01K 1/0107
                                                    119/170
(Continued)

FOREIGN PATENT DOCUMENTS

CN    111819141 A    10/2020
CN    118055882 A     5/2024
(Continued)

OTHER PUBLICATIONS

Communication pursuant to Rules 161(1) and 162 EPC issued by the European Patent Office in related European Patent Application No. 22812860.9 on May 23, 2024, 3 pages.
(Continued)

*Primary Examiner* — Joshua G Kotis
(74) *Attorney, Agent, or Firm* — Gesmer Updegrove LLP

(57) ABSTRACT

A container assembly processing system is disclosed that includes a container lifting assembly for lifting a container vertically from a carrier on a conveyor system.

26 Claims, 27 Drawing Sheets

(51) Int. Cl.
*B65G 1/137* (2006.01)
*B65G 17/32* (2006.01)

(52) U.S. Cl.
CPC .............. *B65G 2201/0235* (2013.01); *B65G 2201/025* (2013.01); *B65G 2201/0258* (2013.01); *B65G 2201/0261* (2013.01)

(58) Field of Classification Search
CPC ... B65B 43/265; B65B 43/285; B65B 43/325; B65B 43/345; B65B 43/365; B65D 5/6614; B65D 5/6676; B65D 5/006; B65D 5/44; B65D 5/445
USPC .............................. 53/458, 382.1, 382.2, 390
See application file for complete search history.

(56) References Cited

U.S. PATENT DOCUMENTS

| | | | |
|---|---|---|---|
| 4,067,456 A | | 1/1978 | Schmitt |
| 4,215,520 A | * | 8/1980 | Heinzer ................. B65B 9/213 53/552 |
| 4,385,482 A | * | 5/1983 | Booth ..................... B65B 43/56 53/247 |
| 4,508,484 A | | 4/1985 | Heiz |
| 4,722,430 A | | 2/1988 | Canziani |
| 4,776,742 A | | 10/1988 | Felder |
| 4,846,105 A | * | 7/1989 | Caldwell .............. A01K 1/0125 119/168 |
| 4,936,735 A | | 6/1990 | Ryan |
| 4,949,897 A | | 8/1990 | Pawlak et al. |
| 5,352,081 A | | 10/1994 | Tanaka |
| 5,584,431 A | * | 12/1996 | Clement ................... A47F 7/28 229/125 |
| 6,561,339 B1 | | 5/2003 | Olson et al. |
| 6,997,666 B1 | | 2/2006 | Rodgers et al. |
| 7,481,472 B2 | | 1/2009 | Cawley et al. |
| 8,989,918 B2 | | 3/2015 | Sturm |
| 9,061,868 B1 | | 6/2015 | Paulsen et al. |
| 10,843,333 B2 | | 11/2020 | Wagner et al. |
| 11,420,329 B2 | | 8/2022 | Wagner et al. |
| 2004/0194428 A1 | | 10/2004 | Close et al. |
| 2004/0206054 A1 | * | 10/2004 | Welborn ................. B65B 35/50 53/475 |
| 2005/0227843 A1 | * | 10/2005 | Brintazzoli ........... B65B 43/305 493/71 |
| 2008/0232938 A1 | | 9/2008 | Weed et al. |
| 2009/0026041 A1 | | 1/2009 | Schaefer |
| 2010/0022372 A1 | * | 1/2010 | Kobierzycki .......... B65G 25/10 493/52 |
| 2011/0005174 A1 | * | 1/2011 | Prahm ..................... B65B 5/061 901/50 |
| 2011/0014021 A1 | | 1/2011 | Reid et al. |
| 2011/0061995 A1 | * | 3/2011 | Huff ........................ B65D 1/34 198/463.3 |
| 2012/0083920 A1 | * | 4/2012 | Suyama ................. B65B 55/20 198/346.2 |
| 2013/0036716 A1 | * | 2/2013 | Tsutsumi .................. B65B 7/20 53/564 |
| 2015/0375880 A1 | * | 12/2015 | Ford ..................... B65B 11/105 53/147 |
| 2016/0083129 A1 | * | 3/2016 | Prahm ....................... B65B 5/10 53/244 |
| 2017/0267469 A1 | | 9/2017 | Miyoshi et al. |
| 2018/0044120 A1 | | 2/2018 | Mäder |
| 2018/0072551 A1 | * | 3/2018 | Burkhard ................ B67C 3/225 |
| 2018/0265291 A1 | * | 9/2018 | Wagner ................ B65G 1/1378 |
| 2018/0273296 A1 | * | 9/2018 | Wagner ................ B65G 1/1378 |
| 2018/0282066 A1 | * | 10/2018 | Wagner ............ G05B 19/41815 |
| 2019/0047787 A1 | | 2/2019 | Fosnight et al. |
| 2019/0270197 A1 | | 9/2019 | Wagner et al. |
| 2019/0270537 A1 | * | 9/2019 | Amend, Jr. ................ B25J 9/16 |
| 2019/0337733 A1 | | 11/2019 | Wehner et al. |
| 2020/0283186 A1 | | 9/2020 | Bouche et al. |
| 2020/0346790 A1 | | 11/2020 | Prakken et al. |
| 2021/0078742 A1 | * | 3/2021 | Hashimoto ................ B25J 9/06 |
| 2022/0055843 A1 | | 2/2022 | Bair et al. |
| 2022/0135347 A1 | | 5/2022 | Cohen et al. |
| 2022/0363470 A1 | | 11/2022 | Austrheim |
| 2022/0402638 A1 | * | 12/2022 | Mondini ................ B29C 65/787 |
| 2023/0264841 A1 | * | 8/2023 | Zweekhorst ............ B65B 23/02 53/473 |
| 2023/0382646 A1 | | 11/2023 | Austrheim et al. |
| 2023/0415790 A1 | | 12/2023 | Austrheim |

FOREIGN PATENT DOCUMENTS

| | | |
|---|---|---|
| EP | 3395732 A1 | 4/2018 |
| IT | 20190009079 A1 | 4/2021 |
| WO | 2009143335 A2 | 11/2009 |
| WO | 2019175424 A1 | 9/2019 |
| WO | 2019201764 A2 | 10/2019 |
| WO | 2023064554 A2 | 4/2023 |

OTHER PUBLICATIONS

Annex to Form PCT/ISA/206 issued by the European Patent Office, as the International Searching Authority, in related International Application No. PCT/US2022/046707 on Feb. 20, 2023, 3 pages.

Magway, Magway / Delivery Utility / Delivering the Future Today, Youtube, Aug. 10, 2018, retrieved from the Internet: URL:https://www.youtube.com/watch?v=IIlq9JSalSY on Aug. 10, 2018, 3 pages.

Notification of Transmittal of the International Search Report and the Written Opinion of the International Searching Authority and the International Search Report and Written Opinion of the International Searching Authority, the European Patent Office, in related International Application No. PCT/US2022/046707 on Apr. 19, 2023, 22 pages.

\* cited by examiner

AUTOMATED PROCESSING OF CONTAINER ASSEMBLY SYSTEMS AND METHODS

PRIORITY

The present application claims priority to U.S. Provisional Patent Application No. 63/255,994 filed Oct. 15, 2021, the disclosure of which is hereby incorporated by reference in its entirety.

BACKGROUND

The invention generally relates to automated sortation and other processing systems, and relates in certain embodiments to programmable motion control, e.g., robotic, systems for processing objects such as parcels, packages, articles, goods, for the purpose of sortation, distribution, automated storage and retrieval (ASRS), etc.

In certain object processing systems, objects may be provided in containers (including plastic totes, mail carrier totes, or cardboard boxes) that are moved in a processing environment that may, for example, include belted or roller conveyors that may be level, sloping, angled or curved. In such systems, the objects may be provided in the containers (including plastic totes, mail carrier totes, or cardboard boxes) to facilitate containing the objects during movement as well as provide a degree of certainty regarding positioning of the containers where the containers are of a known size.

In further object processing systems, certain automated material handling systems store or retrieve or sort to a variety of containers (again, any of plastic totes, mail carrier totes, or cardboard boxes, etc.). In order to homogenize the form factor of the totes for conveyance, for instance, these automated systems may employ carriers to convey the containers, instead of having the containers directly on the conveyor. The carriers may uniformly contact one another, providing an indexing system for containers on the queued carriers. The carriers may also facilitate moving the containers along uneven section conveyors, or on sloping, angled or curved conveyors. For example, U.S. Patent Application Publication No. 2019/0270537 published Sep. 5, 2019 discloses the use of box trays for holding boxes on conveyor systems, as well as box covers for protecting tops of boxes.

The box trays may be made from a therma-formed plastic and shaped in a way to hold the box, and yet be easily conveyed. The trays make it easier to accurately index a set of boxes, that is, if box-holding trays are temporarily held in a line on a conveyor, so that an automated delivery system delivers items to the boxes automatically, then it is important to convert the desired location to a range of distances, e.g., the center of box 5 is at 3.2 meters from the beginning. This is possible because the tray may be more rigid than the box that it carries. Also the tray may be designed so that trays can be lined up end-to-end on a minimal pressure conveyor without buckling.

In certain applications however, it can be difficult and time consuming to manually remove a box from its tray. An important aspect of the use of the automated system may be to reduce reliance on labor, which is partially nullified if a person is needed to populate totes in trays manually, or remove the containers from their carriers. Further, it is difficult, in particular, to do this manually because the container may be heavy, not properly closed, and/or lack graspable and/or accessible features.

There remains a need, therefore, for an automated system for more effectively and efficiently managing the use of trays for boxes, where the boxes include the objects being processed.

SUMMARY

In accordance with an aspect, the invention provides a container assembly processing system that includes a container lifting assembly for lifting a container vertically from a carrier on a conveyor system.

In accordance with another aspect, the invention provides a container assembly processing system that includes a collar lifting assembly for lifting a collar vertically from a container on a conveyor system.

In accordance with another aspect, the invention provides a container assembly processing system for assembling and de-assembling container assemblies including carriers, containers and collars, wherein the carriers carrying the containers and containers carry the collars when assembled.

In accordance with another aspect, the invention provides a method of de-assembling a container and carrier assembly that includes lifting the container off of the carrier, and permitting the carrier to be moved generally horizontally along the conveyor system.

In accordance with a further aspect, the invention provides a method of assembling a container and carrier assembly that includes placing a container vertically onto a carrier, and permitting the container and carrier to be moved together generally horizontally along the conveyor system.

BRIEF DESCRIPTION OF THE DRAWINGS

The following description may be further understood with reference to the accompanying drawings in which.

The drawings are shown for illustrative purposes only.

DETAILED DESCRIPTION

Applicant has discovered that an automated system may be provided for separating the container (e.g., box, bin, tote, etc.) from its carrier on a conveyor section. In accordance with an aspect, a lifting station is inserted into a conveyance line/flow such that a container on its carrier enters the station, and at the exit, the container is provided in one conveyor zone, and the carrier is provided in its own conveyor zone.

Figure 1:
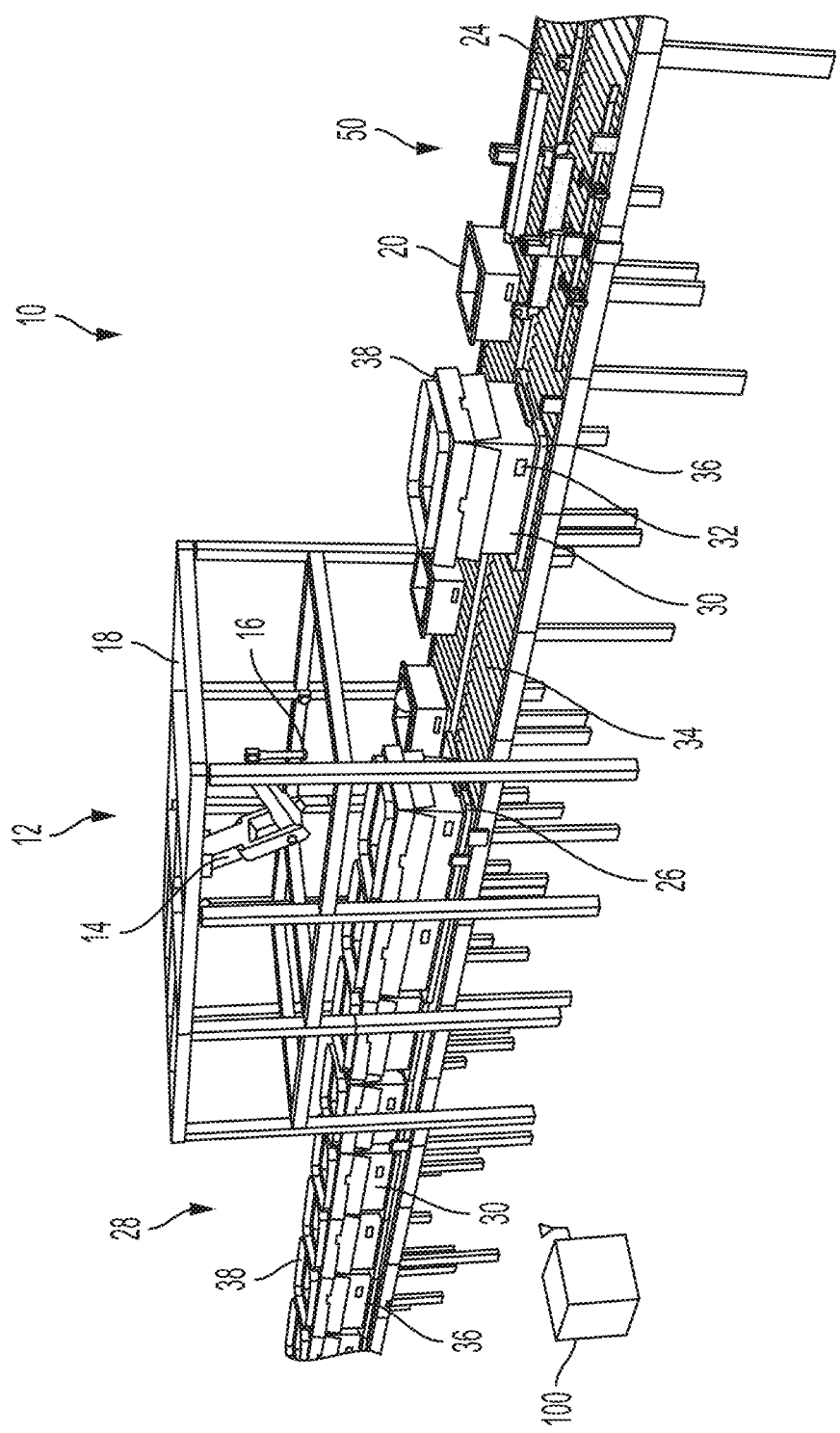
FIG. 1 shows an illustrative diagrammatic view of an object processing system in accordance with an aspect of the present invention that includes a containing lifting system.

With reference to FIG. 1, in accordance with an aspect, the invention provides an object processing system 10 that includes a processing station 12 with a programmable motion device 14 having an end effector 16, wherein the device 14 is suspended by a support structure 16 over conveyors 24, 34. Input containers (e.g., totes, bins, boxes) on the input conveyor 24 provide objects to the processing station 12 for processing (e.g., into containers 34) on the output conveyor 34. The containers 34 may each be provided on carriers 36 (as further shown in FIGS. 2 and 3), and may each include a collar 38 that maintains a fixed position of the container closure flaps 40 on the container 30, and is open on the top (as shown at 42) to permit objects to be placed into the container 30. The system further includes a container lifting system 50 as discussed in more detail below.

Figure 2:
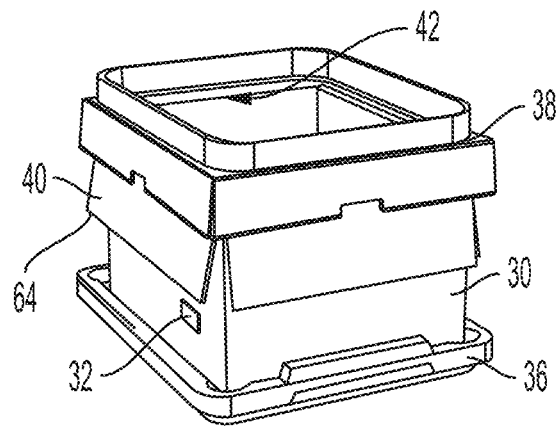
FIG. 2 shows an illustrative diagrammatic view of a container, cover and tray system for use in accordance with an aspect of the present invention.
Figure 3:
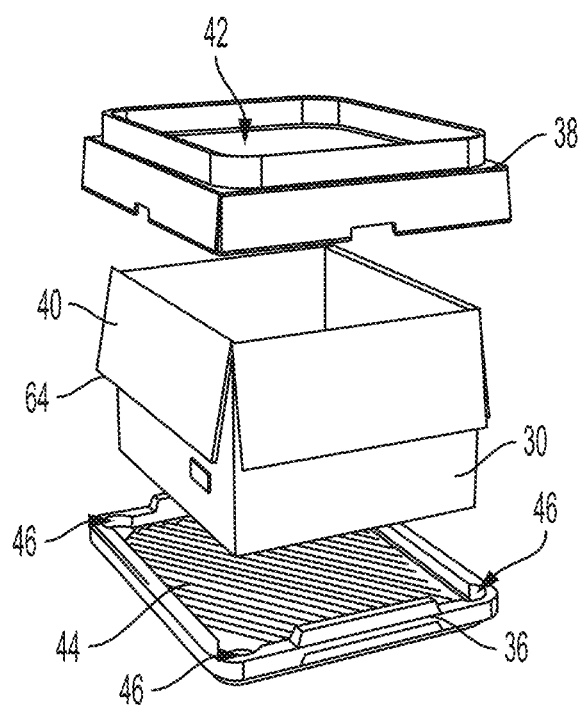
FIG. 3 shows an illustrative diagrammatic exploded view of the container, cover and tray system of FIG. 2.

Wirth reference to FIG. 2 and FIG. 3, each carrier 36 may include a relief surface 44 on the container-receiving surface of the carrier, and may further include corner channels 46. The relief surface 44 facilitates lifting a container from the carrier (by reducing any surface tension between the container and the carrier). The corner channels 46 permit flow of air to and from the container-receiving surface of the carrier to also facilitate both placement of a container onto the container-receiving surface as well as removal of a container from the container-receiving surface. The carriers 36, containers 30 and collars 38 may further include labels, as well as alignment systems as disclosed in U.S. Patent Application Publication No. 2019/0270537 published Sep. 5, 2019, the disclosure of which is hereby incorporated by reference in its entirety.

Figure 4:
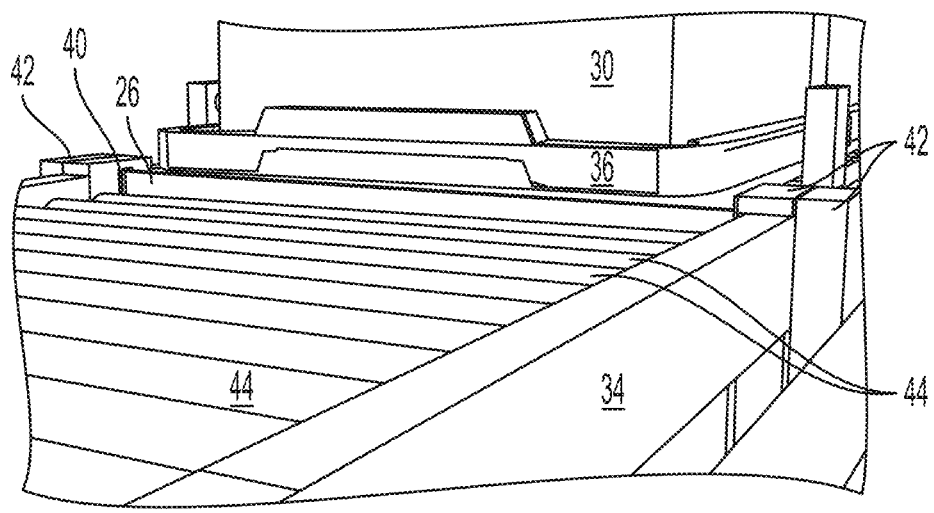
FIG. 4 shows an illustrative diagrammatic view of a stop plate use in the system of FIG. 1.
Figure 5:
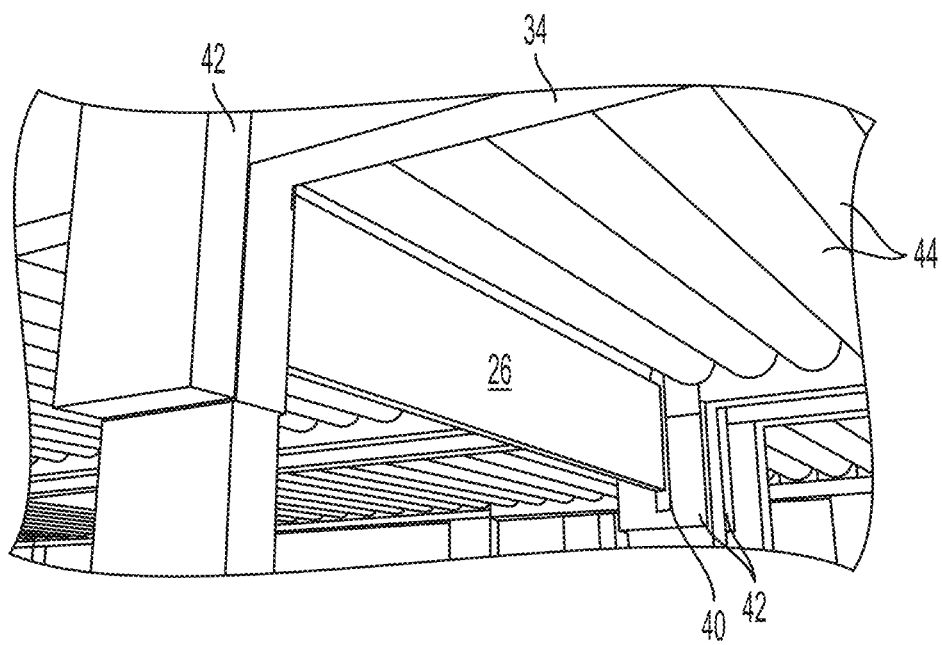
FIG. 5 shows an illustrative diagrammatic underside view of the stop plate of FIG. 4.

A retractable stop plate 26 is also provided at the processing station 12, and is positioned to be raised and lowered from between a pair of rollers of the roller conveyor 34. The retractable stop plate causes the carriers 36 on the conveyor 34 to abut one another by stopping a (first) carrier of a queue of carriers (each with a container) as shown at 28. This provides a convenient and accurate indexing system for the containers 30 on the conveyor 34, and in particular within the processing station 12. Objects therefore, may be accurately placed into a plurality of containers within the processing station 12 since the exact locations of the containers is known. FIG. 4 shows the stop plate 26 raised through the rollers 44 of the conveyor 34, and FIG. 5 shows the stop plate 26 lowered, permitting carriers to continue along the conveyor 34. The stop plate 26 may be moved (raised and lowered) along a track 48, and is driven by one or two powered actuators 42 at one or both ends of the stop plate 26.

Figure 6:
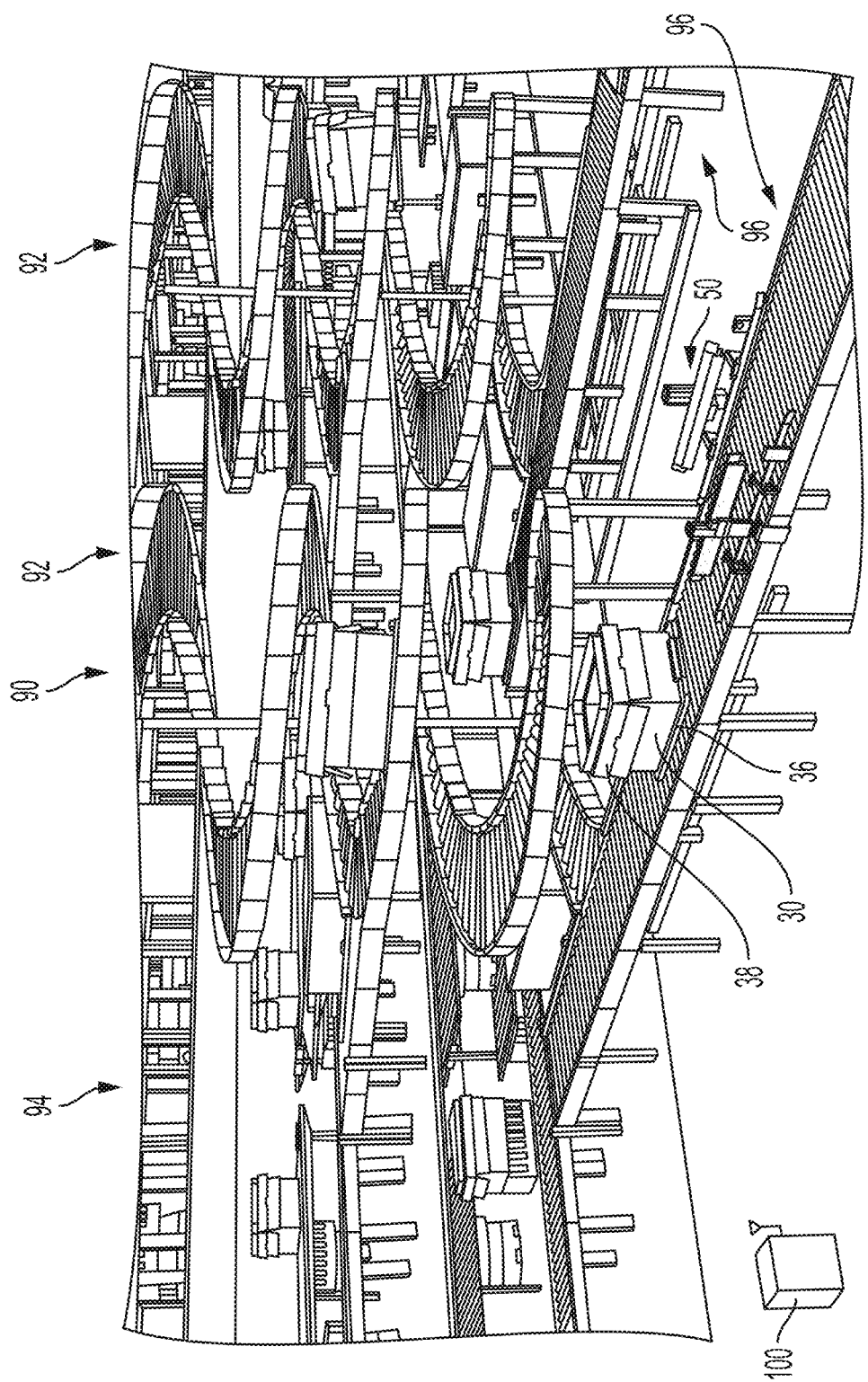
FIG. 6 shows an illustrative diagrammatic view of a multi-level processing system with container lifting systems in accordance with an aspect of the present invention.

FIG. 6 shows a further object processing system 90 that includes helical conveyor sections 92 that move carriers 36 with containers 30 (and collars 38) from processing levels 94 to output conveyors 96. The output conveyor 96 may also include the container lifting system 50 as discussed in more detail below. The use of the carriers facilitates movement of the containers along the helical conveyor sections 92. The conveyors, programmable motion devices, lifting system, sensors and detectors may all be coupled (e.g., wired or wirelessly) to, and the operations discussed herein may be controlled by, one or more computer processing systems 100.

In accordance with various aspects, the invention provides a system (e.g., container lifting system 50) that automatically separates a container from its carrier, and may also build container assemblies as discussed below. A container-carrying carrier is conveyed to an area with a mechanism that lifts the container off of the carrier. The carrier can then pass underneath the container on the conveyor, while the container is raised. Once the carrier clears, then the mechanism lowers the container and allows the container to be conveyed away.

Figure 7A:
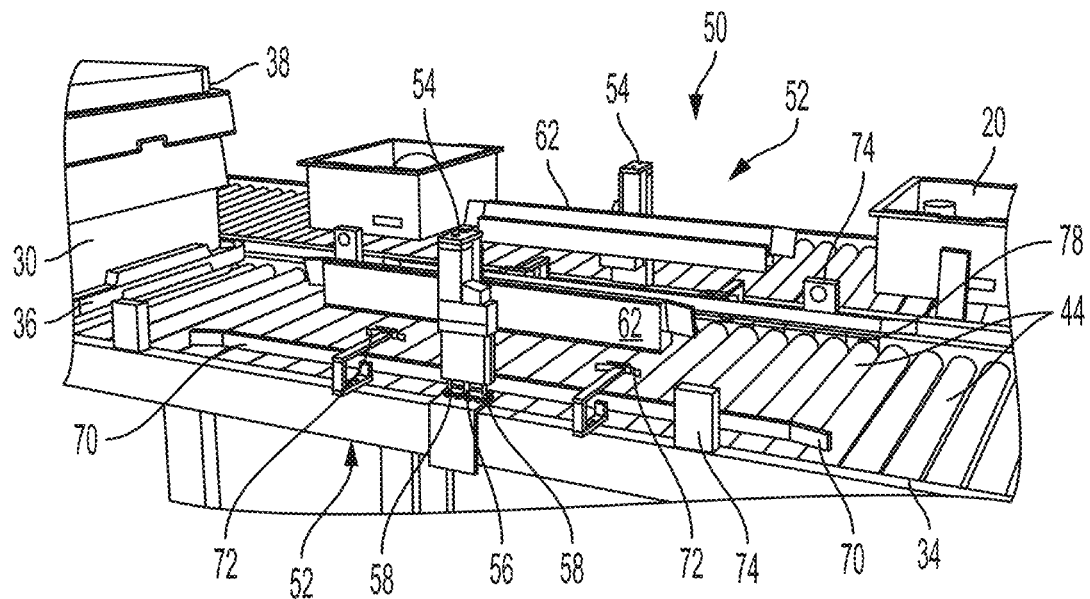
FIGS. 7A-7F show illustrative diagrammatic enlarged views of a container lifting system of FIG. 1, showing the container lifting system without a container assembly (FIG. 7A), showing the containing lifting system with the container assembly positioned for processing (FIG. 7B), showing the container beginning to be lifted (FIG. 7C), showing the container lifted from its associated tray (FIG. 7D), showing the tray moving away from the lifted container (FIG. 7E), and showing the container and cover being lowered onto the conveyor having been separated from the tray (FIG. 7F)

FIG. 7A shows a container lifting system 50 that includes a pair of container lifting assemblies 52 (one on either side of the output conveyor 34). Each lifting assembly 52 includes an actuator assembly 54 (e.g., including an electric motor or hydraulic system) that travels vertically along a main shaft 56, while being prevented from rotating by guide rods 58 (as more clearly shown in FIGS. 7C and 7D). Each lifting assembly may include a commonly controlled actuator assembly 54 or may include a single common actuator (e.g., from under the conveyor) that controls movement of the lifting assembly. Each container lifting assembly 52 also includes a conveyor rail mount 60 for coupling to the conveyor 34, as well as a V-shaped channel structure 62 (as further shown in FIGS. 9A and 9B) for capturing an outer elongated edge 64 of a container closure flap 40. The V-shaped channel structure 62 may also include guide plates 66 that facilitate entry of the outer edge 64 of the container closure flap 40 into the area of the structure 62. Each lifting assembly 52 also includes carrier alignment rails 70 for aligning a carrier therebetween on the conveyor 64, as well as container alignment plates 72 for aligning containers therebetween on the carriers. (or on the conveyor 64 as discussed further below). Each of the alignment rails 70 and alignment plates 72 may be mounted on actuatable mounts that are adjustable to accommodate containers and carriers of different sizes on the conveyor.

The system also includes a plurality of perception systems 74 for monitoring positions and locations of the carriers (and containers and collars as discussed below) on the conveyor 64. Additionally, the conveyor 64 includes a weight sensing conveyor section 76 at the lifting assemblies 52 wherein the rollers 44 are mounted on force detection units 78 such as load cells or force sensors. The weight sensing conveyor section 76 permits the system to not only confirm the presence of a container assembly at the lifting assemblies 52, but also permits the system to confirm having lifted a container (and collar) off of a carrier. If accordance with further aspects as discussed below, the weight sensing conveyor section 76 may also facilitate confirming having lifted a collar alone or a container alone.

The system may lift a container (with closure flaps) by the flaps using only the degree of freedom in the lifting mechanism (i.e., using one motor on each side or a common actuation system) and the motion of the conveyor. The system for capturing the closure flaps is passive. When the container is lifted, the flaps are in compression. The system uses the integrity of the closure flap to lift the container. The mechanism is applicable to containers with flaps (e.g., a cardboard box with flaps, or a tote with flaps). The V-shaped channel structures 62 (on both sides of the conveyor 64) functions as a passive end-effector for receiving the flaps wherein the V-shape accommodates uncertainty in the positioning of the flap, and also serves to transmit the holding force to the container. When the lifting assembly rises, the V-shaped end-effectors rise, which then come into contact with the flaps, which then compress the flaps to support the load of the container. When the assembly is lowered, the container is free of the V-channel, and it may be conveyed away.

Figure 7B:
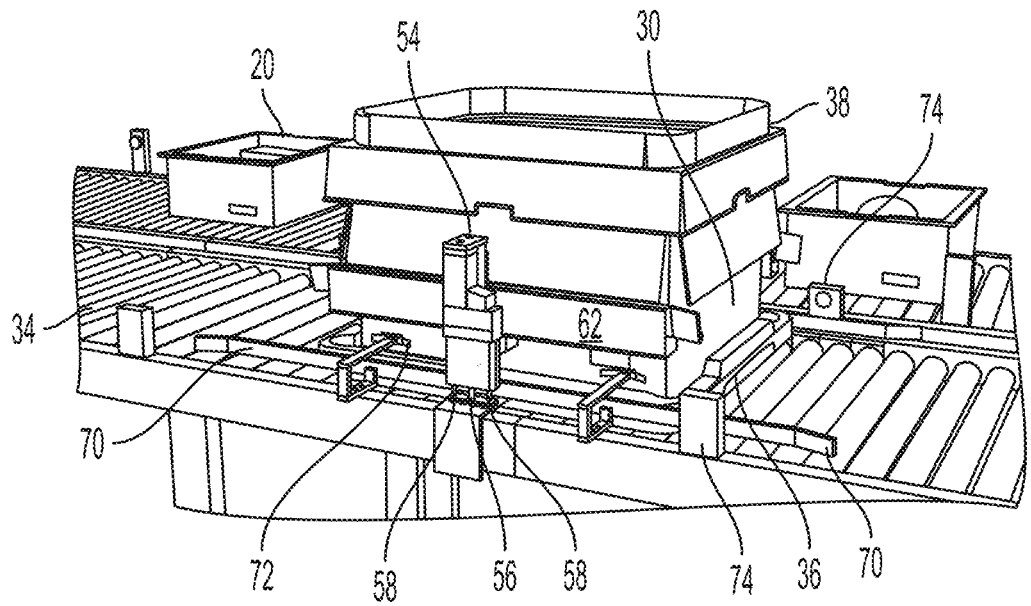

FIG. 7A shows the container 30 and collar 38 on a carrier 36 approaching the container lifting system 50. Each container actuator assembly 54 is lowered such that the V-shaped channel structure 62 is below each outer elongated edge 64 of opposing flaps 40 of the container 30. FIG. 7B shows the carrier 36 (and container 30 and collar 38) in position at the container lifting system 50, again with the container lifting system 50 lowered. The outer elongated opposing edges 64 are loosely positioned within the open V-shaped structure 62 (as further shown in the end view in FIG. 9A).

Figure 7C:
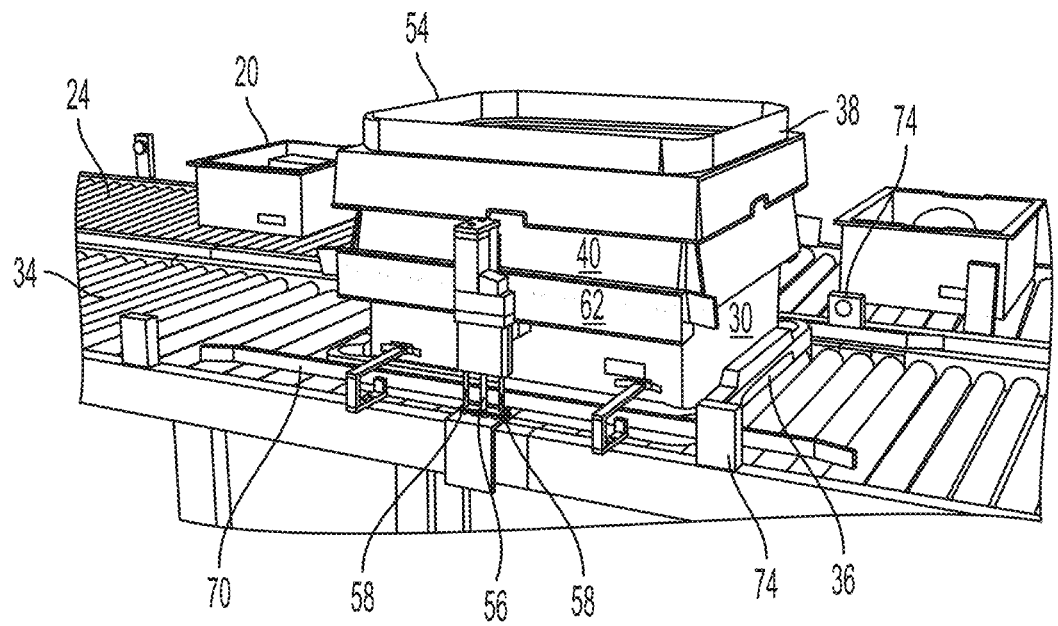
Figure 7D:
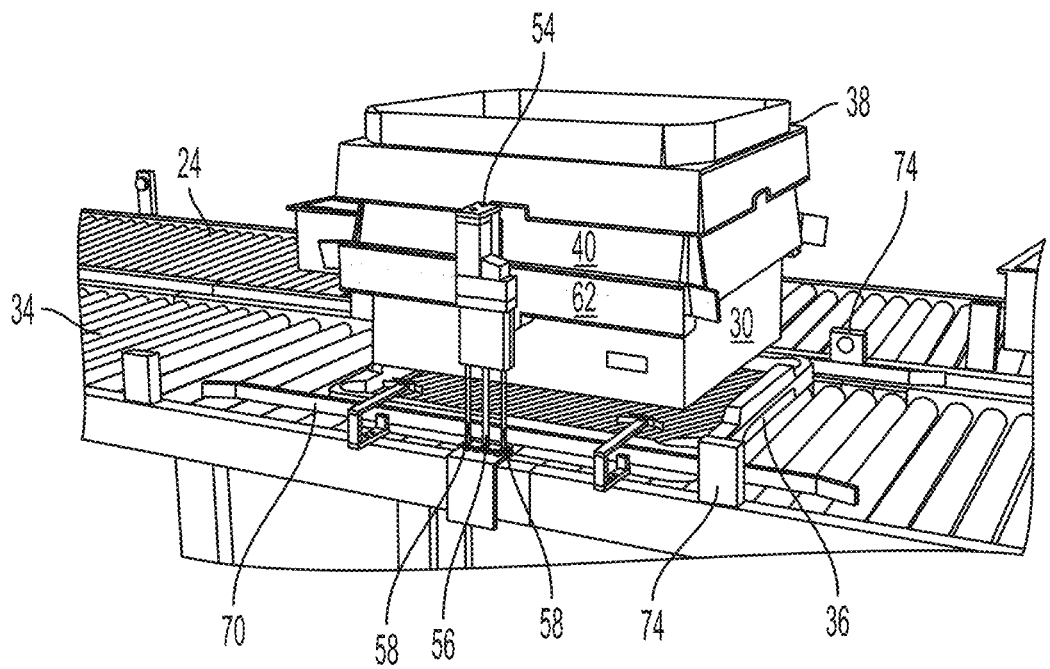
Figure 7E:
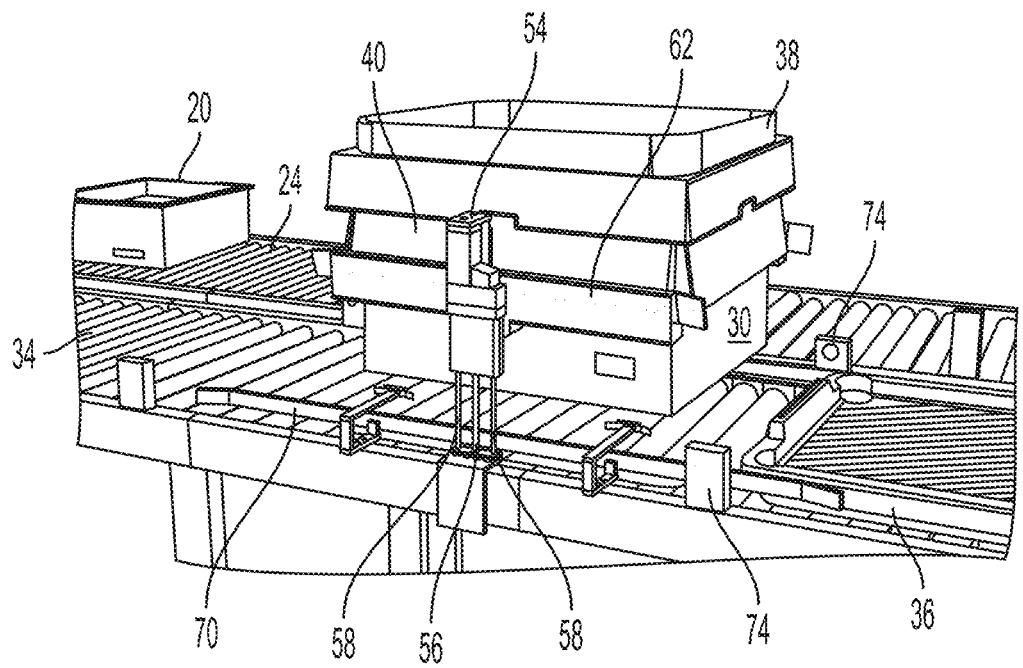
Figure 7F:
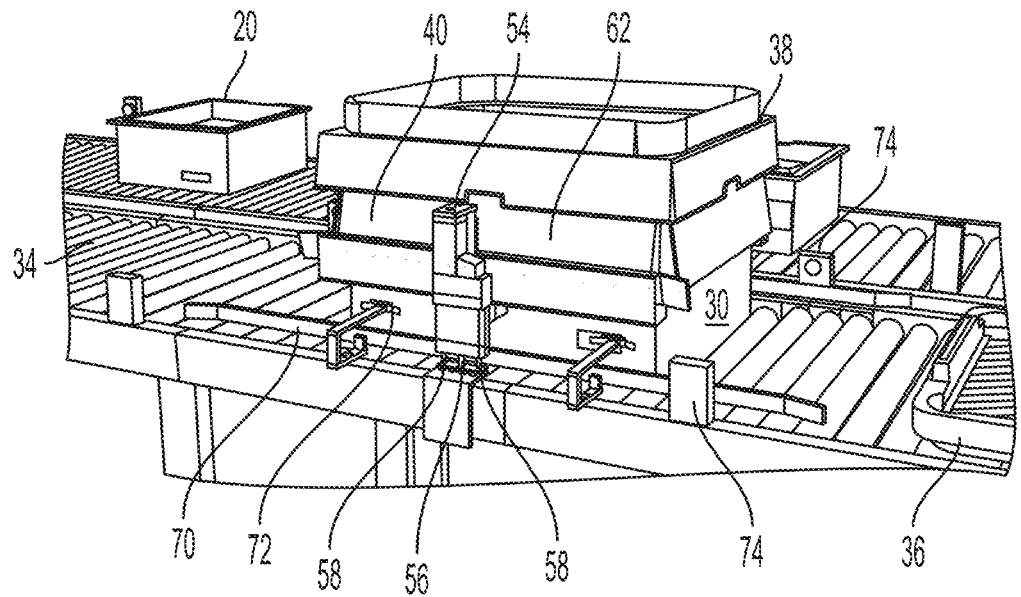

FIG. 7C shows the actuator assembly 54 raised such that the V-shaped channel structure 62 engages the outer elongated edge 64 of the opposing flaps 40 of the container 30. FIG. 7D shows the actuator assembly 54 fully raised such that the V-shaped channel structure 62 lifts the container 30 (together with the collar 38) by the opposing flaps 40. The weight sensing conveyor may provide weight sensing data that confirms that the container and collar are free of the carrier. With reference to FIG. 7E, the carrier is then allowed to move along the conveyor 34. The actuator assembly 54 then lowers the V-shaped channel structure 62 by the outer elongated edge 64 of the opposing flaps 40 of the container 30 until the container (and collar) are resting on the conveyor 34 (again as confirmed by the weight sensing conveyor section), and the container 30 (with collar) may then travel along the conveyor 34 behind the carrier 36 as shown in FIG. 7F.

Figure 8A:
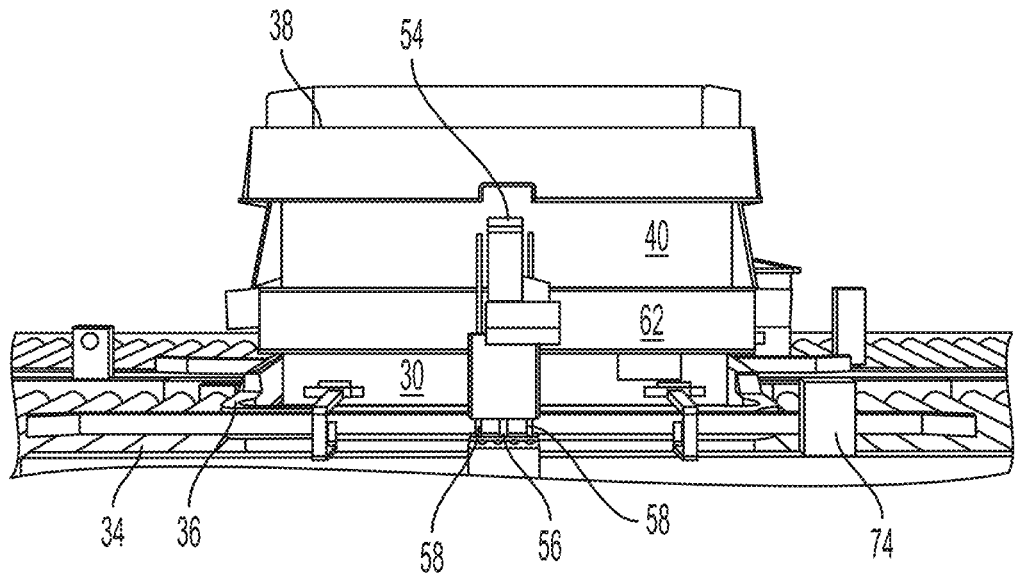
FIGS. 8A and 8B show illustrative diagrammatic side views of the container lifting system of FIG. 1, showing the container not lifted (FIG. 8A) and showing the container lifted (FIG. 8B)
Figure 8B:
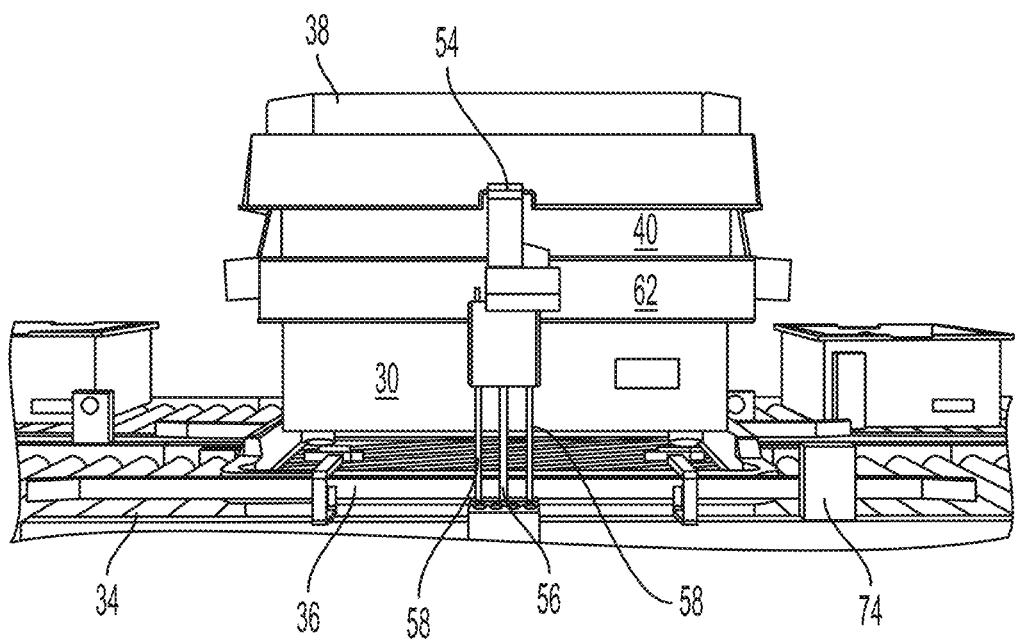
Figure 9A:
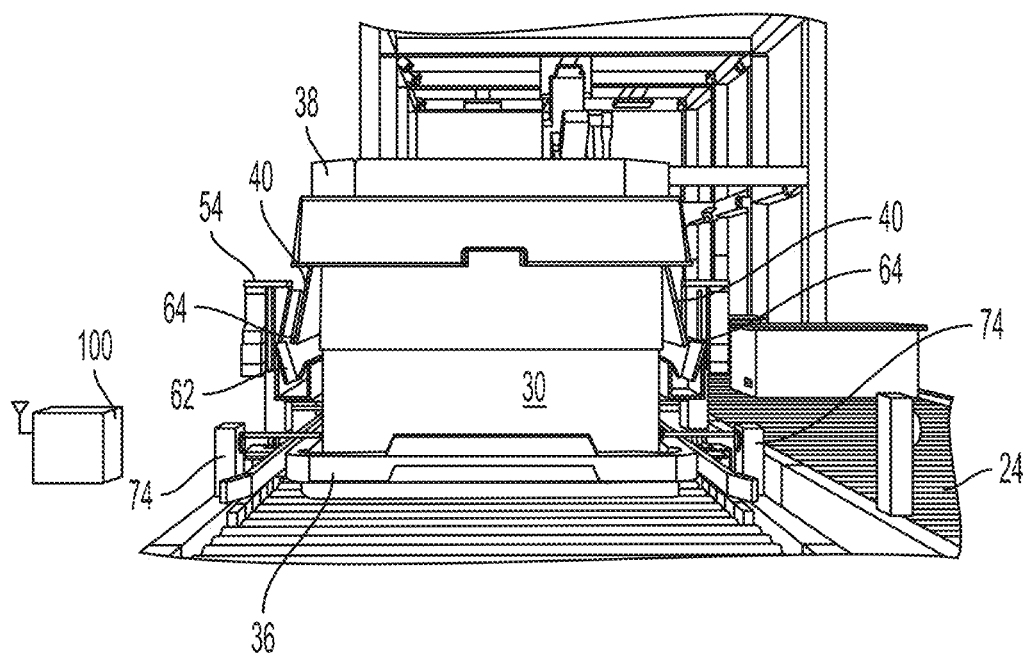
FIGS. 9A and 9B show illustrative diagrammatic end views of the container lifting system of FIG. 1, showing the container not lifted (FIG. 9A) and showing the container lifted (FIG. 9B)
Figure 9B:
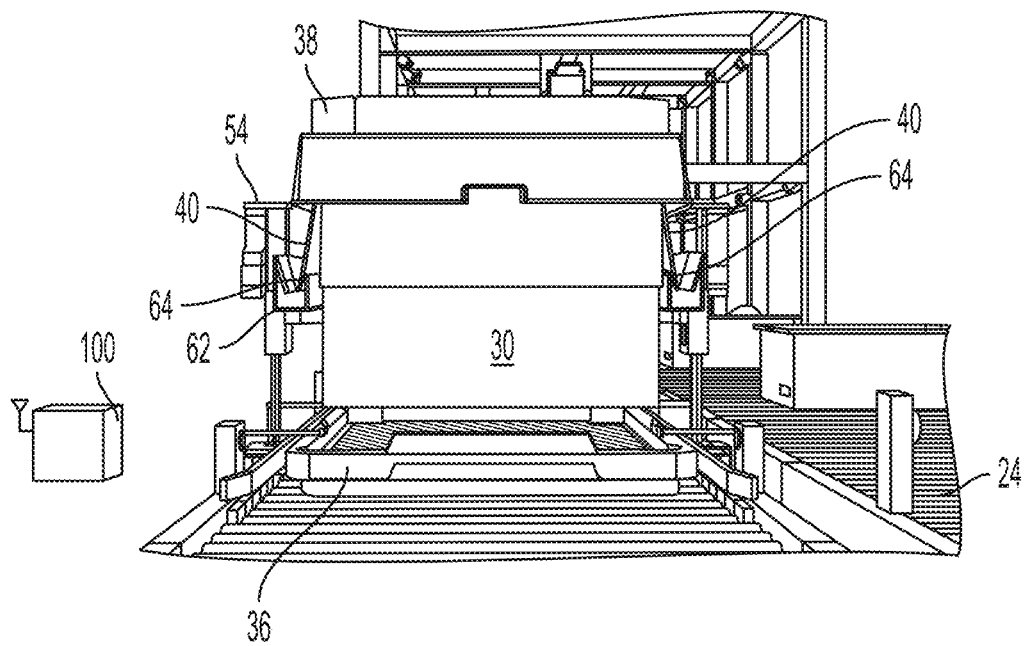

FIG. 8A shows a side view of the actuator assembly 54 in the lowered position such that the container 30 is positioned on the carrier, and FIG. 8B shows a side view of the actuator assembly 54 in the raised position such that the container 30 and collar 38 are vertically separated from the carrier 36. FIG. 9A shows an end view of the actuator assembly 54 in the lowered position such that the container 30 is positioned on the carrier, and FIG. 9B shows an end view of the actuator assembly 54 in the raised position such that the container 30 and collar 38 are vertically separated from the carrier 36.

In accordance with various aspects, the passive V-shaped structure mechanism may be modular, where the attachment that does the lifting, may accommodate different attachments for different kinds of containers: totes w/lip; totes w/flaps; cardboard boxes with flaps. A single direction motor assembly with one degree of freedom lifts the container/tote; this means there's one single DOF, not including the conveyor. The system is attached to the conveyor so it uses the conveyor as built-in free degree of freedom. The way it uses the conveyor is to cause the container/tote and carrier to become laterally separated, after the container is lifted to a degree that allows the carrier to pass underneath. Sensors may also be employed (e.g., perception units on the conveyors as well as weight sensing rollers as discussed below) to sense when a container is fully inside the mechanism and able to be lifted, as well as to confirm lifting or placement of a portion of a container assembly. Sensors may sense that the lift was successful (e.g., photo eyes; or load cells that weigh the conveyor and compare weight with known weight of carrier); and a load cell may be provided with the lifting mechanism to sense the weight of the container/tote being lifted. The end of arm tooling may also adjust for incoming boxes, and may add a degree of freedom for width. The system may sense the width of the carrier's load and adjust the width accordingly.

Figure 10:
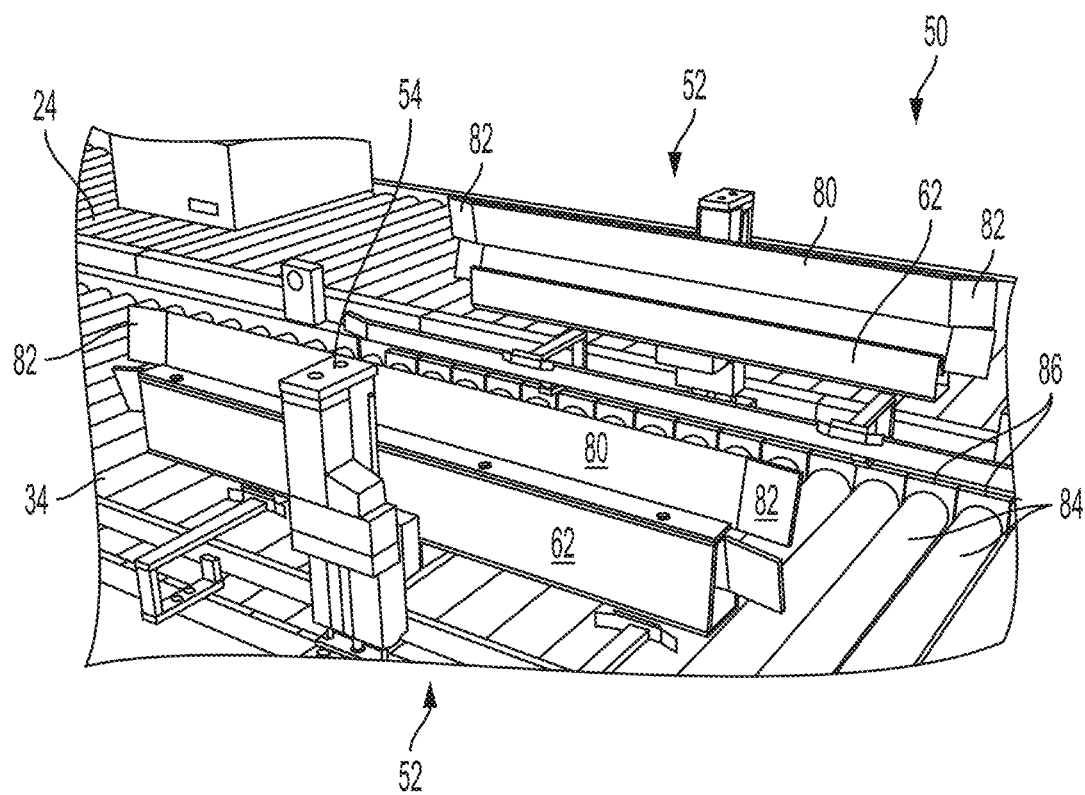
FIG. 10 shows an illustrative diagrammatic view of the container lifting system of FIG. 1 showing an enlarged view of the container engagement system.
Figure 11:
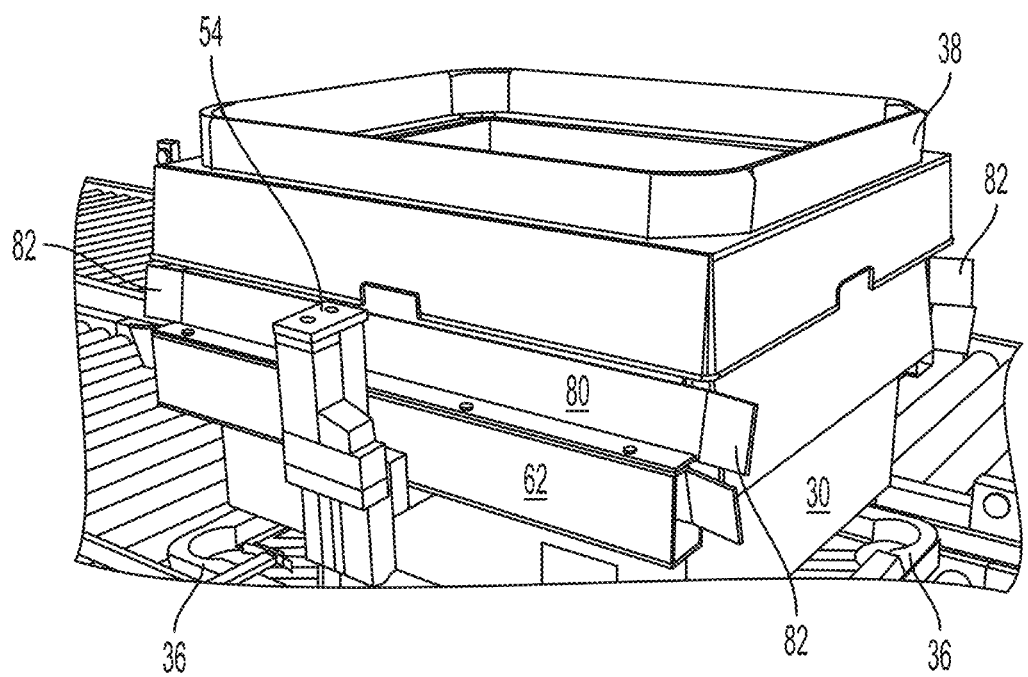
FIG. 11 shows an illustrative diagrammatic view of the container lifting system of FIG. 1 showing an enlarged view of the container engagement system of FIG. 10 with a container in position to be lifted.
Figure 12A:
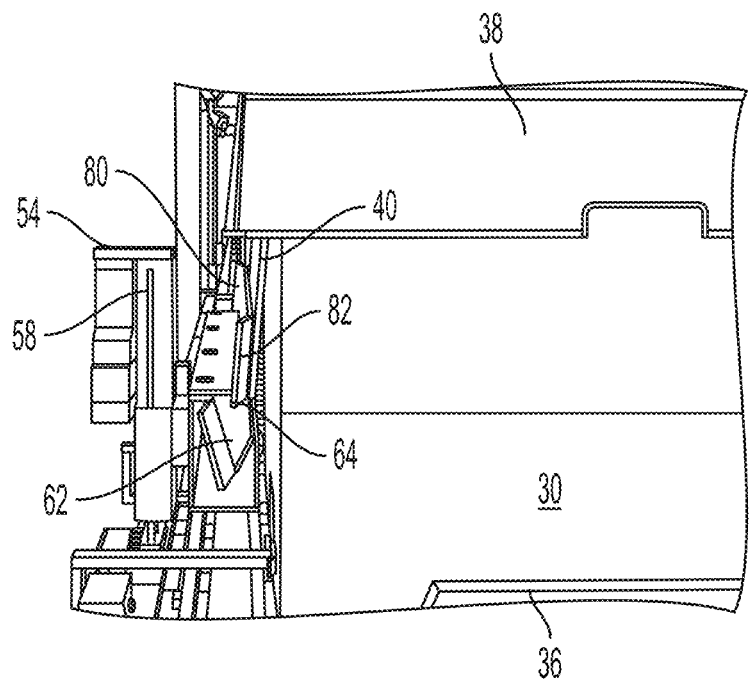
FIGS. 12A and 12B show illustrative diagrammatic end views of the container engagement system of FIG. 11.
Figure 12B:
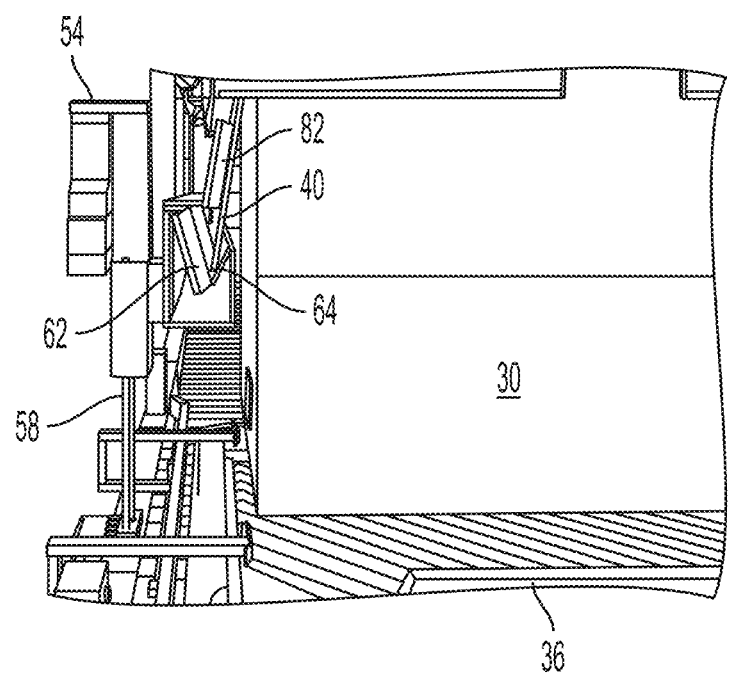

In accordance with certain aspects, a flap support plate 80 may be provided as shown in FIGS. 10 and 11 that provides support for the elongated flaps 40 to inhibit buckling of the flap 40 when the box is lifted. FIGS. 12A and 12B show end views of the system with a container not engaged (FIG. 12A) and with a container being lifted and flap supported (FIG. 12B). As shown in FIGS. 10 and 12A (which also show elements of the container lifting system 50 with lifting assemblies 52 as discussed above), the flap support portion 80 of FIGS. 10 and 12A includes guide plates 82 at the ends thereof to facilitate entry of a box with flaps into the system 50. The elongated inner flat surface of the flap support portion 80 contacts the outer surface of the elongated flaps 40 when lifting the box as shown in FIGS. 11 and 12B, thereby supporting each flap and inhibiting buckling of the flap.

Figure 13A:
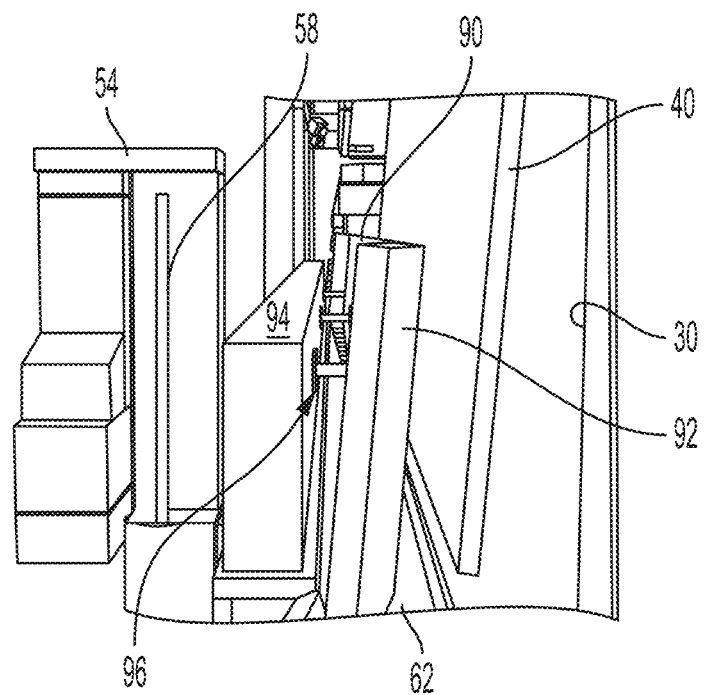
FIGS. 13A and 13B show enlarged illustrative diagrammatic views of the container side flap engagement system of FIGS. 12A and 12B, showing the container not lifted (FIG. 13A) and lifted (FIG. 13B)
Figure 13B:
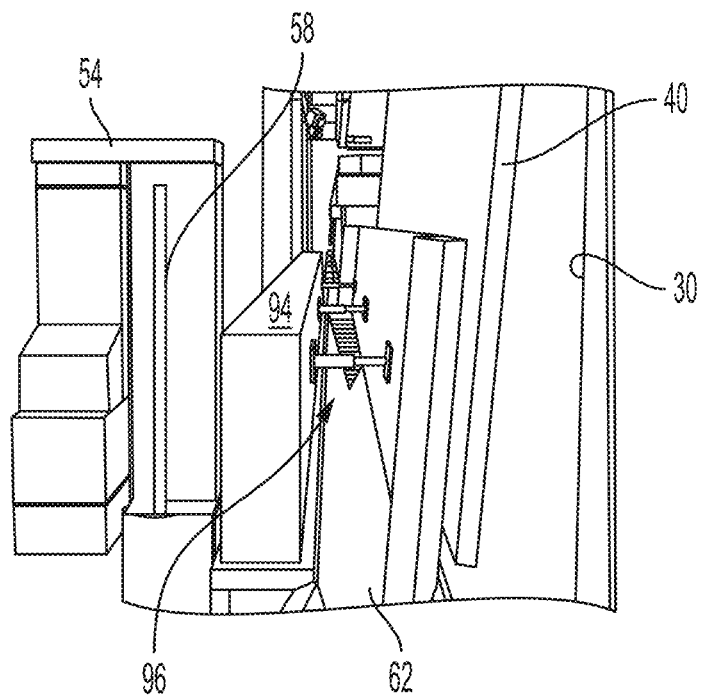
Figure 14A:
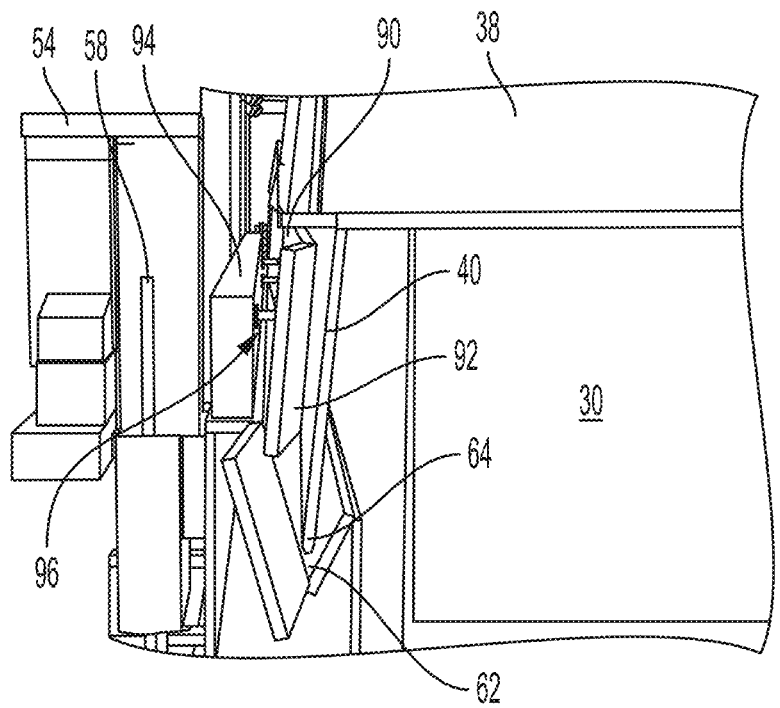
FIGS. 14A and 14B show enlarged illustrative diagrammatic views of the container flap-edge engagement system of FIGS. 12A and 12B, showing the container not lifted (FIG. 14A) and lifted (FIG. 14B)
Figure 14B:
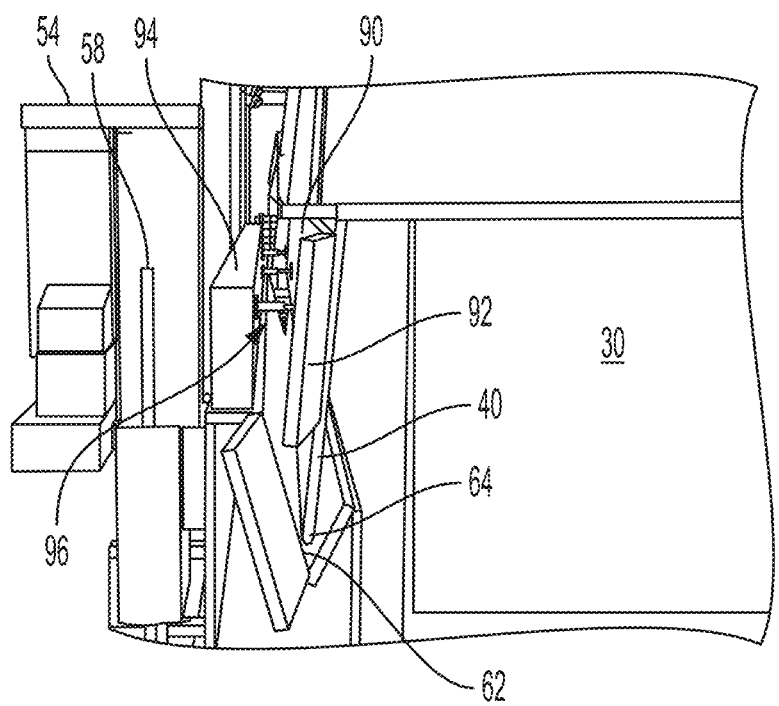

In accordance with further aspects, the anti-buckling flap support portion may be provided on adjustable actuators. FIGS. 13A-14B, for example, show a flap portion 90 with end guide plates 92 that is mounted by linear actuators 96 on a base 94 attached to the V-shaped structure 62. FIGS. 13A and 13B show the flap portion 90 positioned away from the flap 40 (e.g., during positioning as shown in FIG. 13A), and show the flap portion 90 urged forward (shown in FIG. 13B) prior to engagement of the elongated edge 64 and the V-shaped structure 62. FIGS. 14A and 14B show the flap portion 90 positioned away from the flap 40 prior to engagement with the V-shaped structure (FIG. 14A), as well as urged forward (shown in FIG. 14B) following engagement of the elongated edge 64 and the V-shaped structure 62.

The same processes could occur in reverse, in order to place containers onto carriers. In that case, containers would precede the carriers. The container would convey into the mechanism, be lifted, then the carrier gets conveyed in, and the container lowered onto the carrier. In further aspects, a pair of such systems could be stationed near each other with a queue in the middle with an inbound and outbound so that the carriers taken off one are fed to as a source for the other. Carriers are then confined to a closed loop, whose number is determined by the number required of the automated system.

In accordance with further aspects, the system may lift different elements of a container carrier and collar assembly, and further may build such assemblies while permitting unneeded elements of assemblies to pass along a conveyor. In this way, the elements (e.g., containers, collars and carriers) need not be placed on the conveyor in any required order.

Figure 15A:
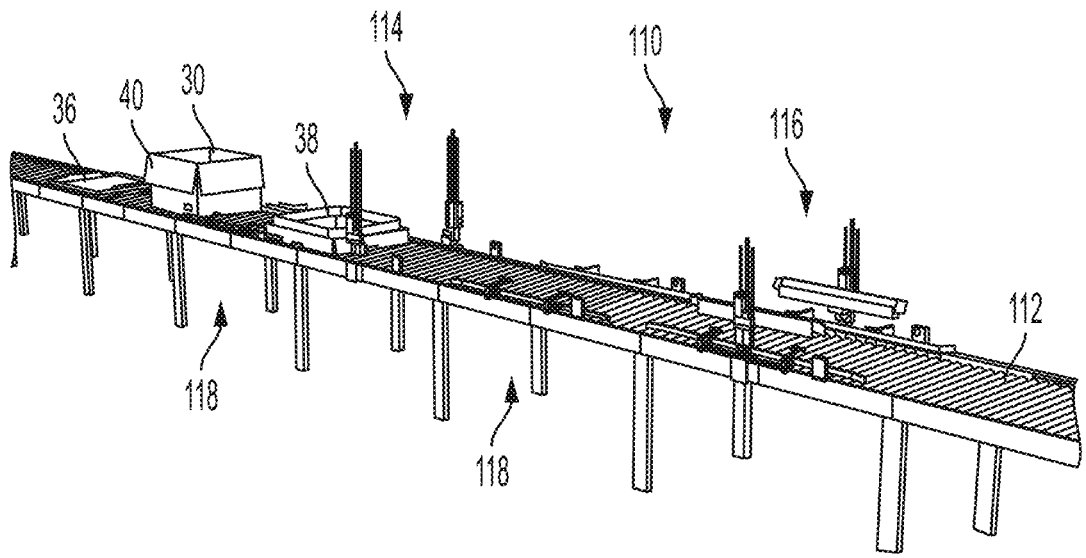
FIGS. 15A-15F show illustrative diagrammatic views of a system in accordance with another aspect of the present invention that includes a container cover lifting system, showing the cover not lifted (FIG. 15A), showing the cover lifted (FIG. 15B), showing the cover placed onto the container (FIG. 15C), showing the container and cover moving the container lifting system (FIG. 15D), showing the container and cover being lifted (FIG. 15E), and showing the container and cover being lowered onto a tray (FIG. 15F)
Figure 15B:
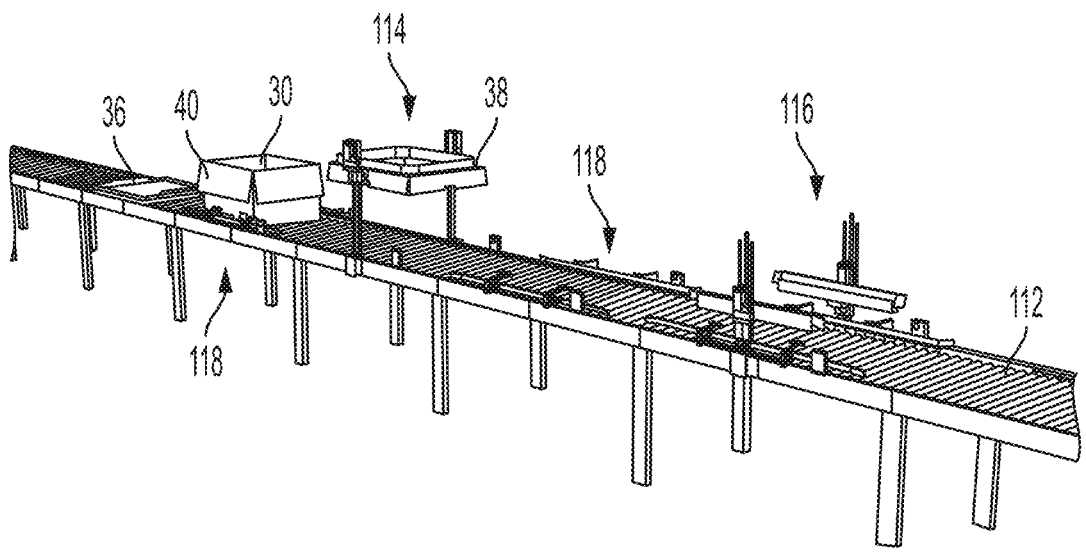
Figure 15C:
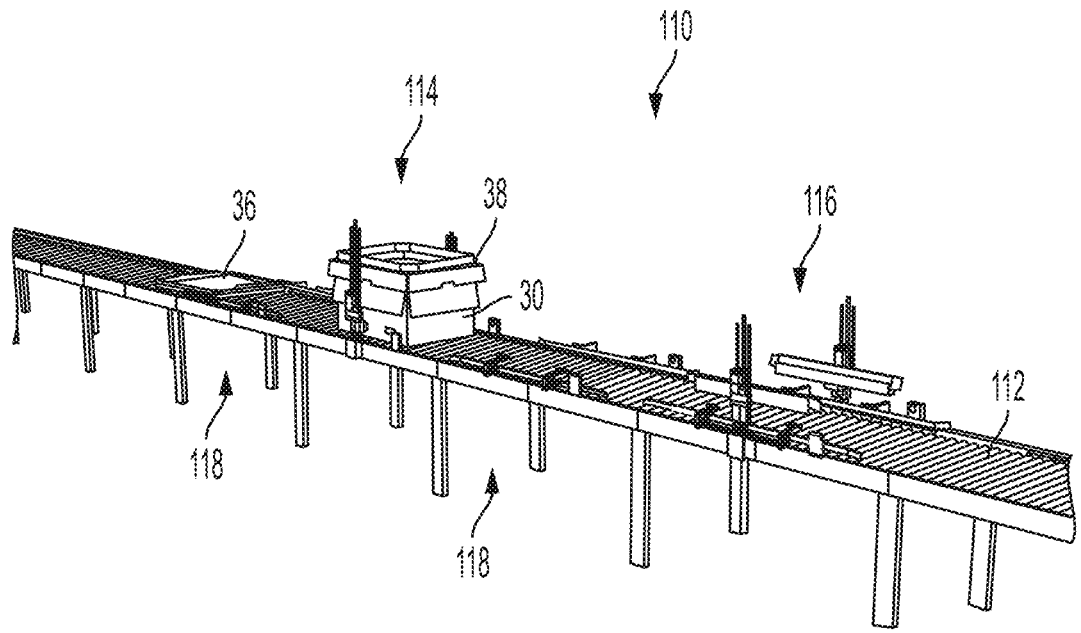

FIGS. 15A-15F, for example, generally show at 110 the building of a container assembly on conveyor 112. In particular, the system 110 includes a pair of combination carrier alignment and container alignment systems 118 (including alignment rails 70 and alignment plates 72 as discussed above), each of which aligns carriers and containers on the conveyor 112. The system 110 also includes a collar lifting system 114 and a container lifting system 116 (as generally discussed above with reference to the system 50). Elements travel along the conveyor 112 (FIG. 15A), and when a collar is selected, the collar 38 is lifted by the collar lifting system 114 (as shown in FIG. 15B and discussed in more detail below with reference to FIGS. 16-18B). Other elements are free to travel under the lifted collar 38, and when a container 30 is selected to receive the collar 38, the collar 38 is lowered onto the container 30 as shown in FIG. 15C.

Figure 15D:
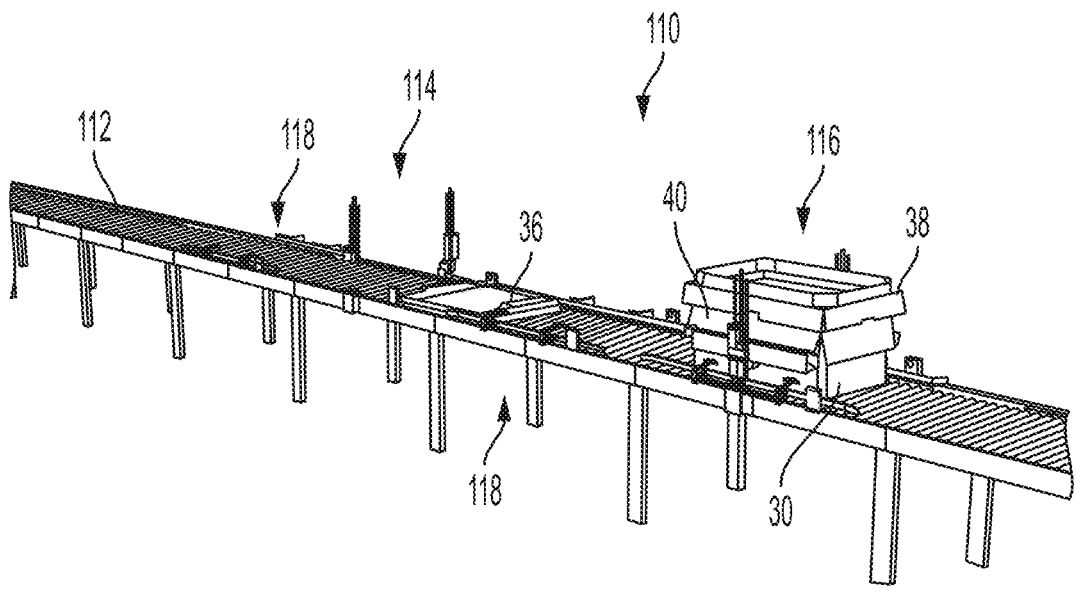
Figure 15E:
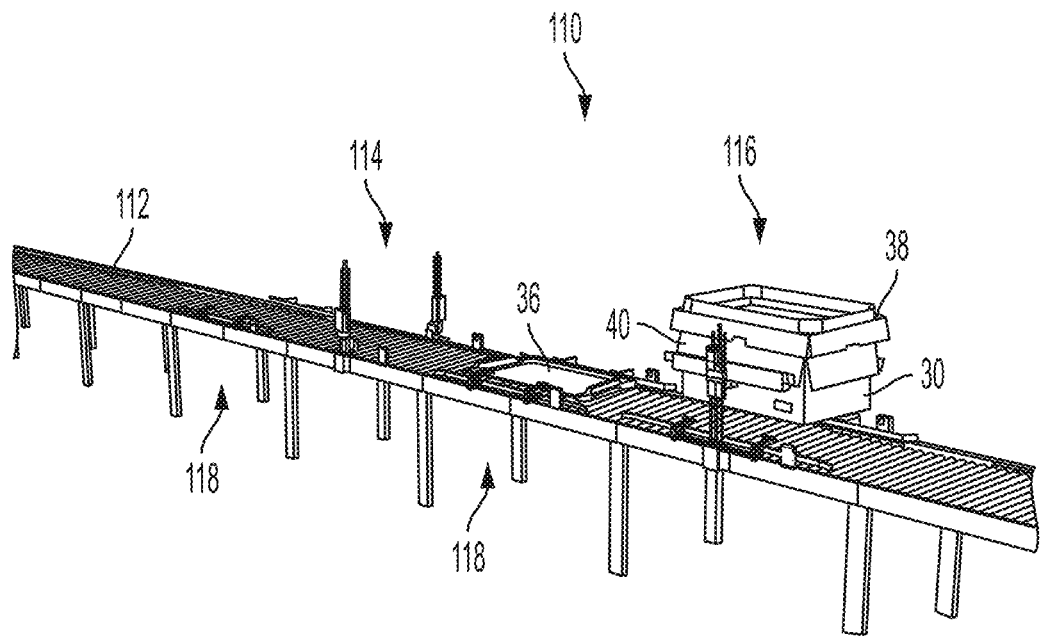
Figure 15F:
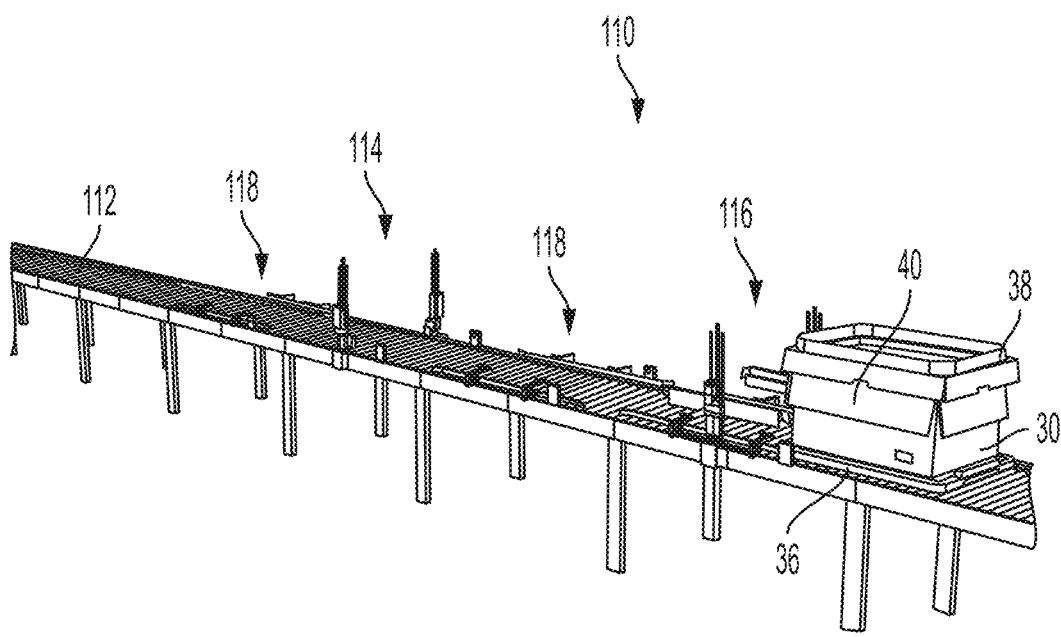
Figure 16:
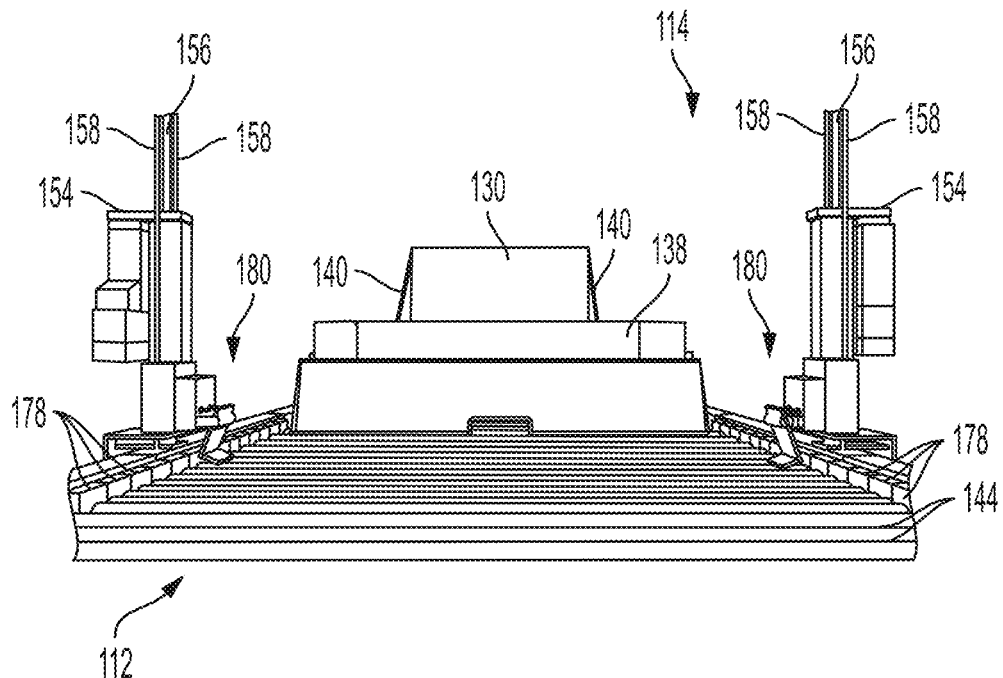
FIG. 16 shows an illustrative diagrammatic view of an end view of the container lifting system of FIGS. 15A and 15B showing the cover not lifted.

The container with collar then travel along the conveyor to the container lifting system 116 as shown in FIG. 15D. The container 30 with the collar 38 is then lifted by the container lifting system 114 (as shown in FIG. 15E) as discussed above, except that the initial position of the V-shaped structure is lowered to accommodate the absence of a carrier on the conveyor. Again, other elements are free to travel under the lifted container 30 and collar 38, and when a carrier 36 is selected to receive the container 30 and collar 38, the container 30 is lowered onto the carrier 36 as shown in FIG. 15F. In this way, container assemblies may be constructed on the conveyor system 112.

Figure 17:
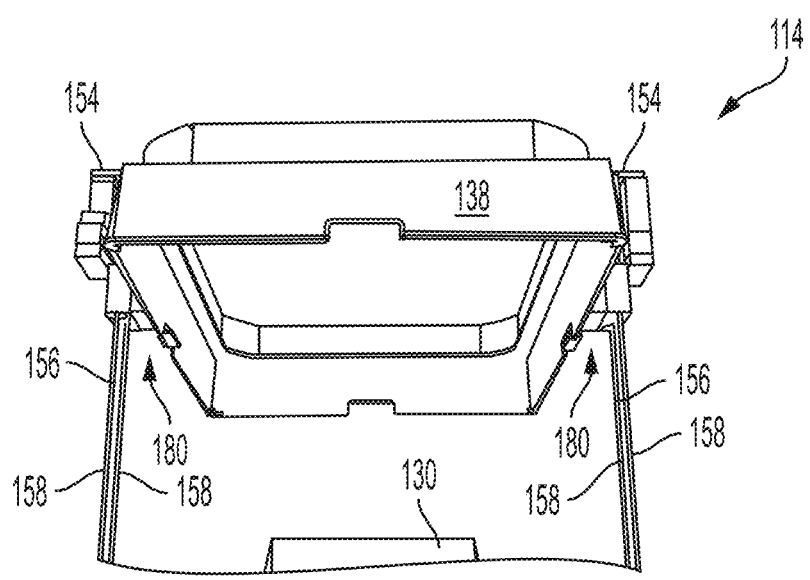
FIG. 17 shows an illustrative diagrammatic view of an end view of the container lifting system of FIGS. 15A and 15B showing the cover lifted.
Figure 18A:
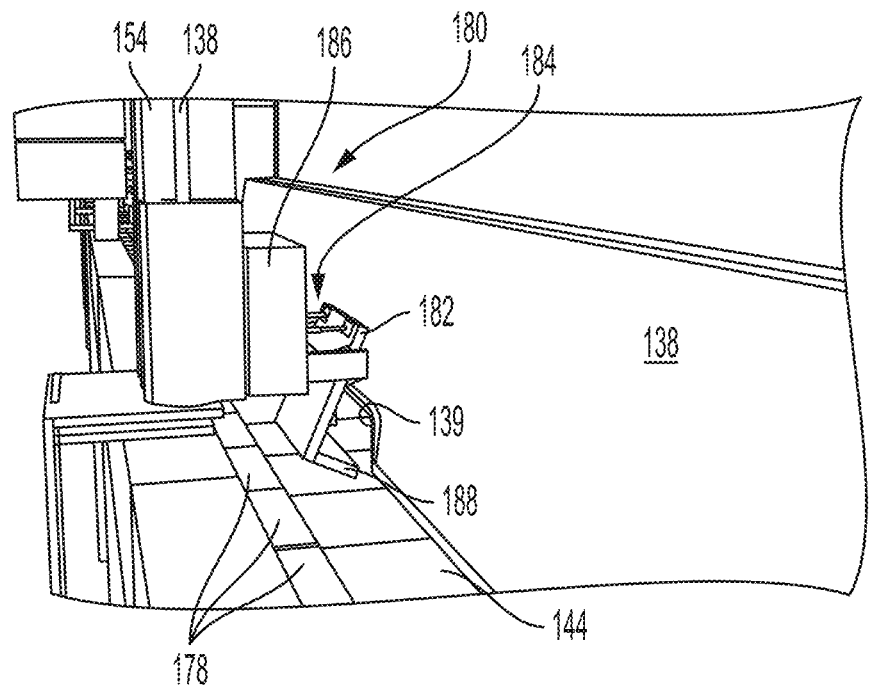
FIGS. 18A and 18B show illustrative diagrammatic enlarged views of an engagement portion of the container cover lifting system, showing the cover not lifted (FIG. 18A) and showing the cover lifted (FIG. 18B)
Figure 18B:
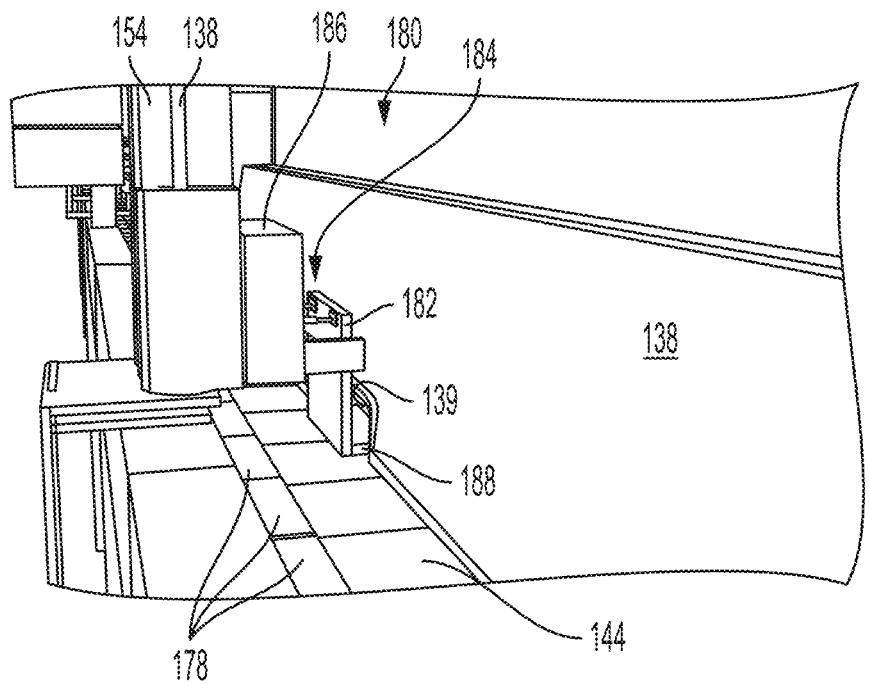

The collar lifting system 112 includes a pair of collar engagement systems 180, each of which includes an L-shaped bracket for engaging an underside of a handle of a collar. In particular, and with reference to FIG. 16, the collar engagement system 180 is attached to a collar actuator assembly 154 that travels vertically along a main shaft as guided by guide rods 158. The system 112 also includes rollers 144 that are mounted on force sensors 178 (such as load cells or force toque sensors) for any of confirming a weight of an object on the conveyor 112 and/or confirming object lifting off of or object placement onto the conveyor. A collar 138 (e.g., with handles 139 as shown in FIGS. 18A and 18B) is presented to the system 112, and a container 130 may be present a distance behind the collar 138 on the conveyor 112. FIG. 17 shows the collar 138 having been lifted by the system 112, permitting other objects (e.g., carriers or boxes) to pass under the lifted collar until a selected container is positioned below the collar 138. In this way no specific order of components is required, and further, the carriers and collars may be recirculated into the system following separation from the containers as discussed below.

With reference to FIGS. 18A and 18B, the collar engagement system 180 includes an L-shaped bracket 182 (including a lifting portion 188) that is pivotally mounted with respect to a base 186 mounted to the collar actuator assembly 154. When the collar 138 is positioned such that a handle opening 139 on the collar 138 is aligned with the portion 188 of the L-shaped bracket 182 (as shown in FIG. 18A), the actuator 184 are retracted, causing the portion 188 to move by a pivoting motion into the handle opening 139 (as shown in FIG. 18B). In this way, a collar may be lifted, and subsequently lowered.

Figure 19:
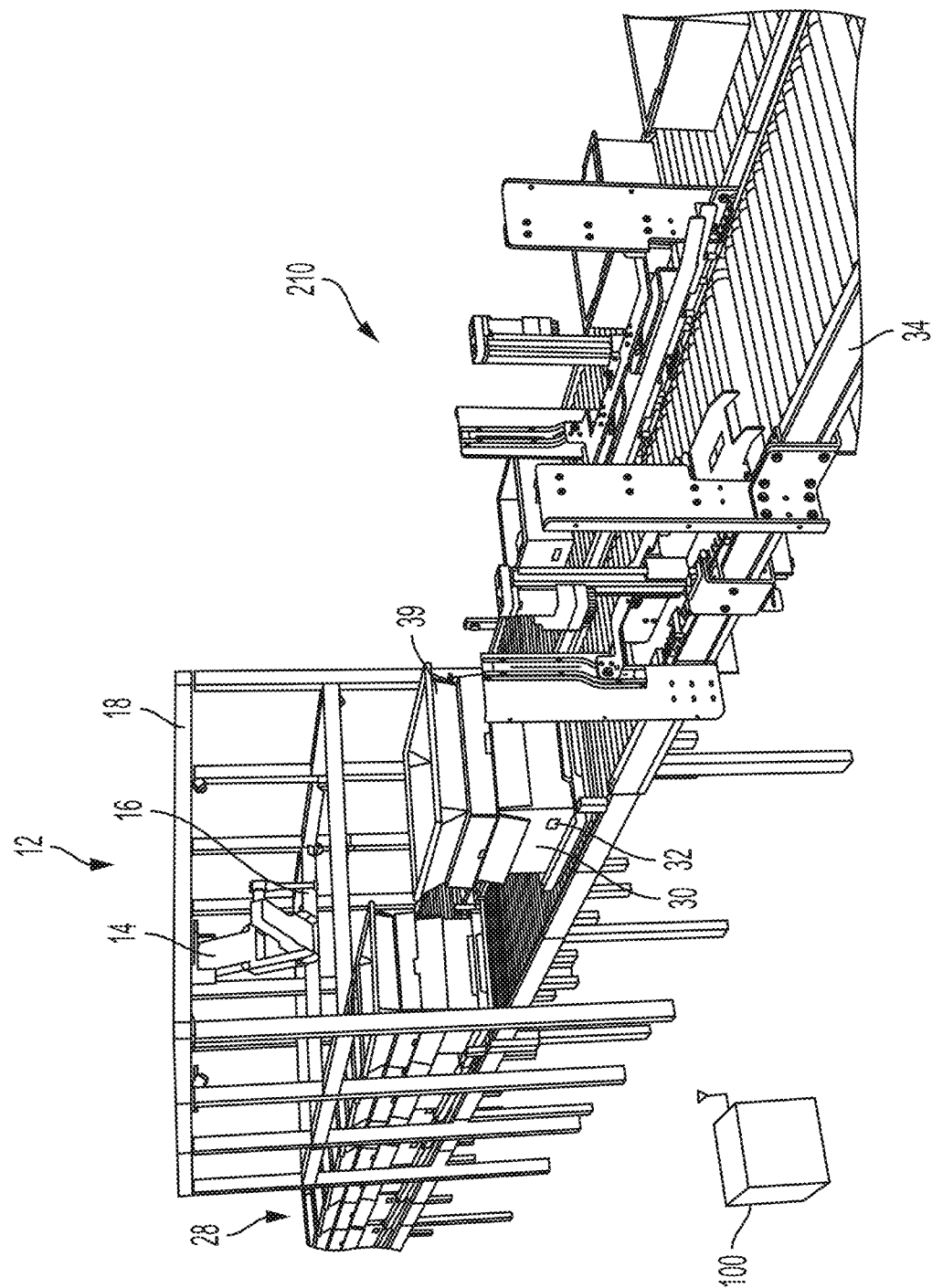
FIG. 19 shows an illustrative diagrammatic view of a container lifting system in accordance with a further aspect of the present invention that includes a lateral offset mechanism to assist in grasping a container.

FIG. 19 shows a container lifting system 210 in accordance with a further aspect of the present invention that includes a lateral offset mechanism for engaging the container. The container assemblies may include covers as discussed above or may include collared covers 39 as shown. The covers 39 add volume to increase container fullness (permitting more objects to be stored in each container) and incorporates a funnel design to bias items towards the center of the box. Further, when these containers and collared covers are placed next to one another, the funnels will be side by side (as shown in FIG. 19 at 28), decreasing any chance of placing an object outside the cover (and container). The use of such uniform sized containers and covers also facilitates boxes caving in or otherwise becoming compromised when stacked.

Figure 20A:
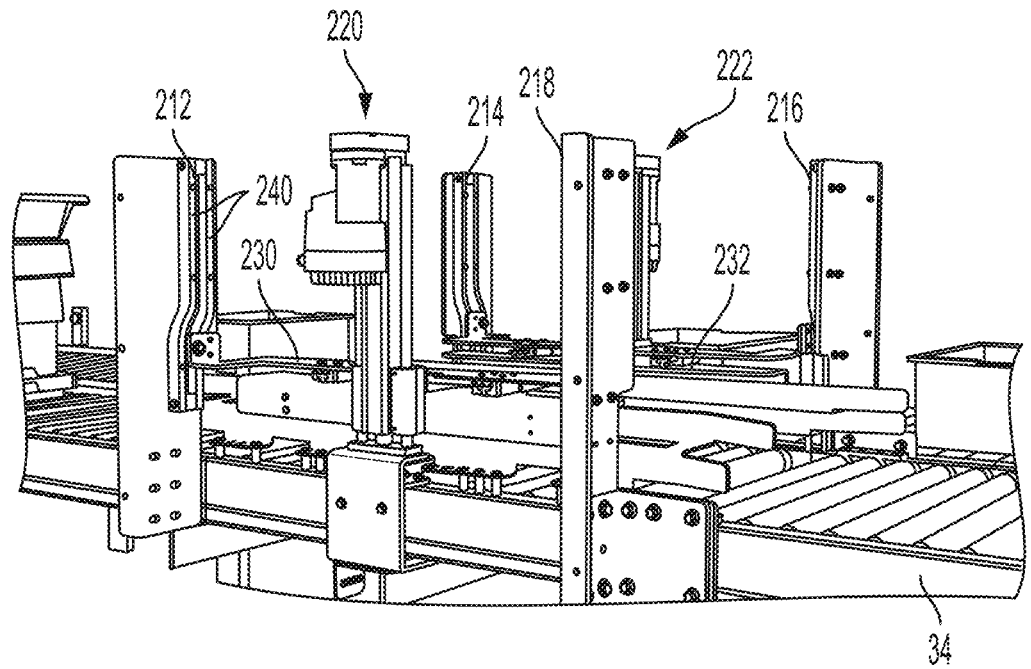
FIGS. 20A-20D show illustrative diagrammatic views of the container lifting system of FIG. 19, showing the lifting system without a container (FIG. 20A), showing the lifting system with a container (FIG. 20B), showing the lifting system having engaged the container using the lateral offset mechanism (FIG. 20C), and showing the lifting system having lifted the container off of its associated tray (FIG. 20D)
Figure 20B:
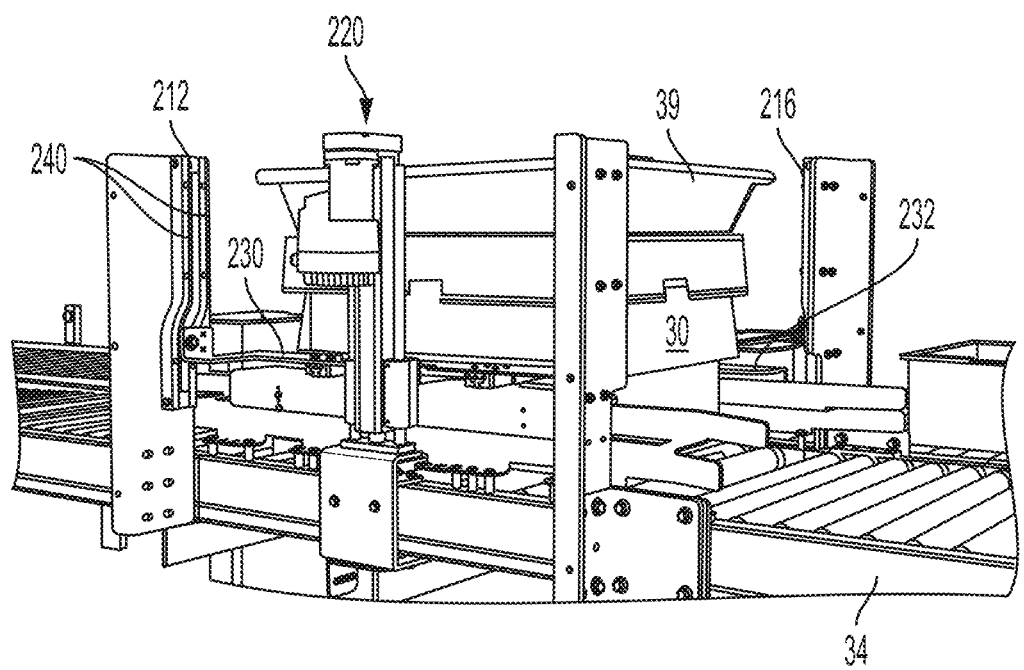
Figure 20C:
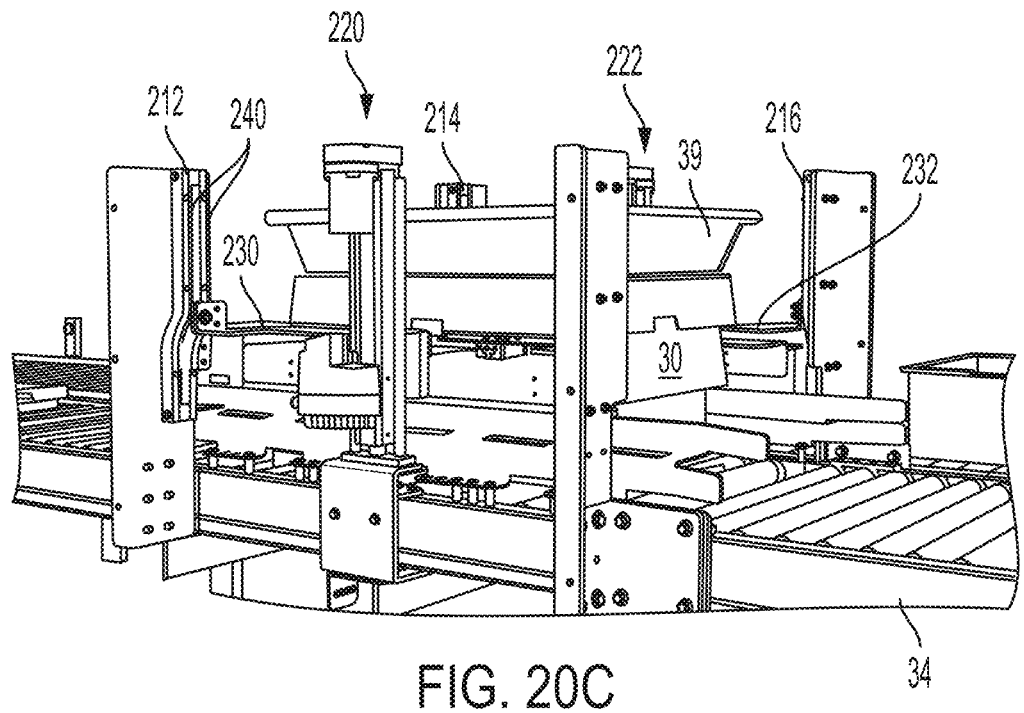
Figure 20D:
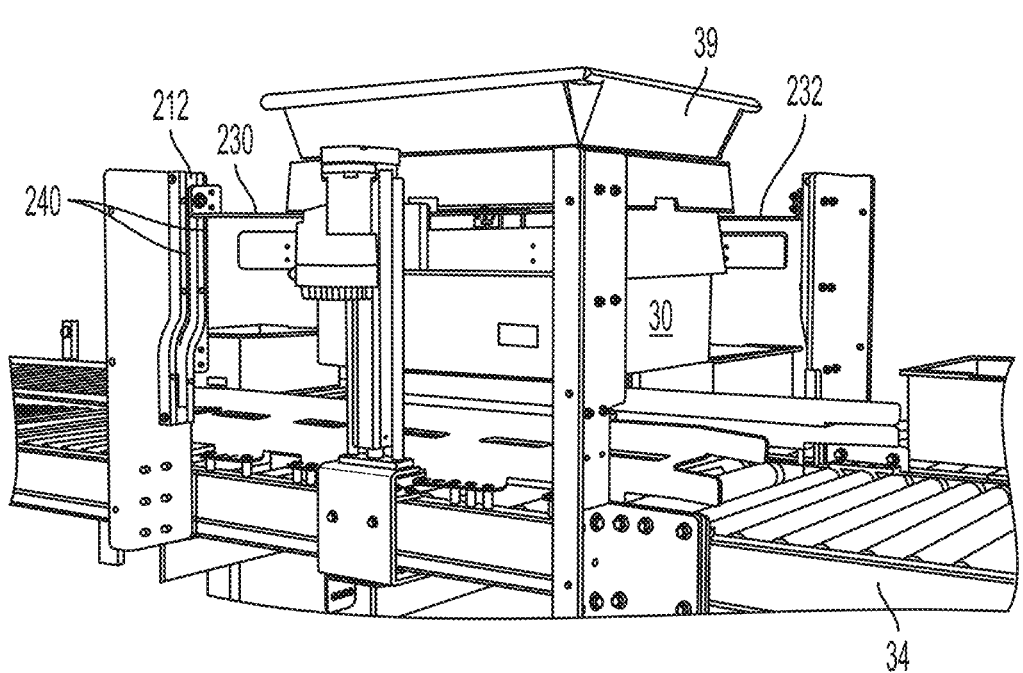

With reference to FIGS. 20A-20D, the container lifting system 210 includes four vertical guides 212, 214, 216, 218, each of which includes a pair of off-set tracks 240. FIG. 20A shows the system 210 without a container assembly, and FIG. 20B shows a container assembly positioned for lifting. An engagement system 230, 232 on each side of the system 210 engages the container and lifts the container with posts running along the guide tracks 240. When the posts reach the off-set portion of the track 240 (as shown in FIG. 20C), the engagement systems 230, 232 move toward each other engaging the container. The container is then engaged and may be lifted as shown in FIG. 20D.

Figure 21A:
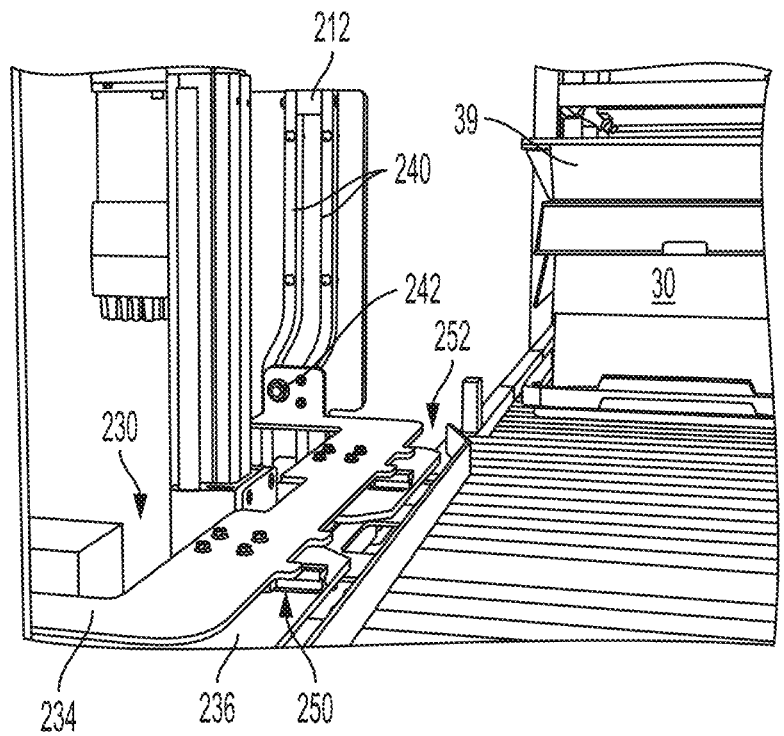
FIGS. 21A and 21B show illustrative diagrammatic end views of the lateral offset mechanism of FIG. 19, showing the lateral offset mechanism in a non-engagement position (FIG. 21A), and showing the lateral offset mechanism in a container engagement position (FIG. 21B)
Figure 21B:
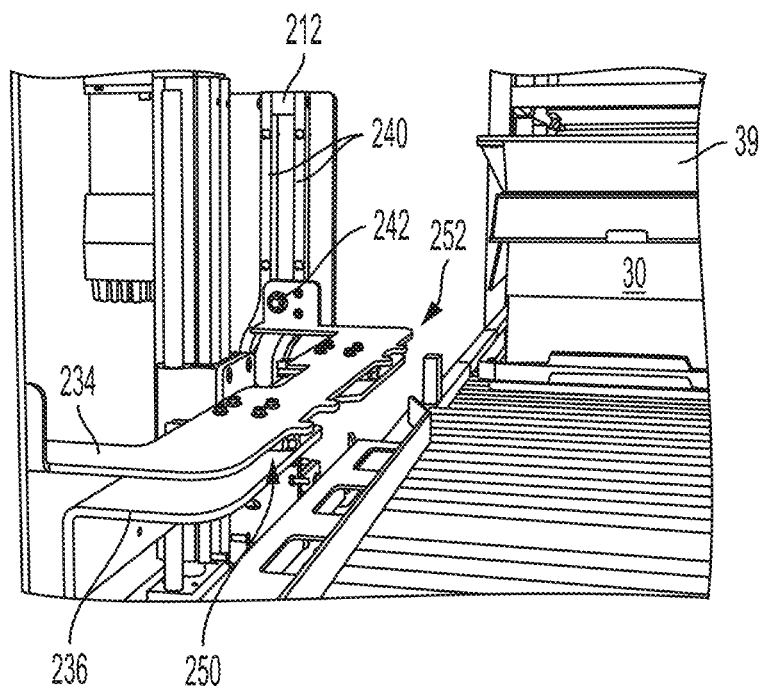

FIGS. 21A and 21B show the lateral offset mechanism, showing the post 242 that travels along the tracks 240 and are attached to a top plate 234. The top plate 234 is slidably attached to a base portion 236 via linear slides 250, 252. When the engagement system is in a lowered position (FIG. 21A) the top plate 234 is retracted with respect to the base 236, and when the engagement system is in the raised position (FIG. 21B) the top plate 234 is extended toward the container from both sides via the lateral offset mechanism and the linear slides 250, 252.

Figure 22A:
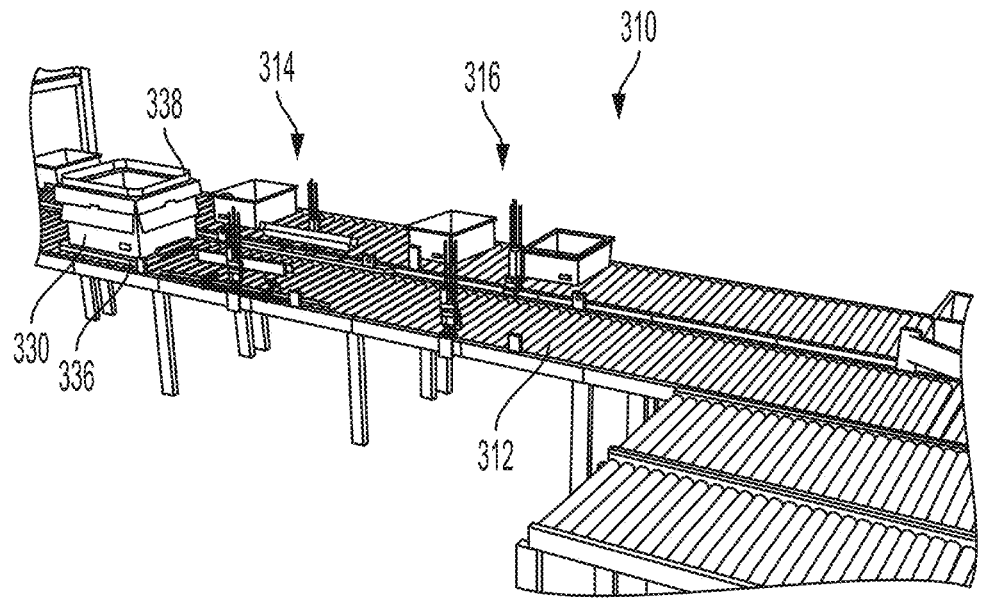
FIGS. 22A and 22B show illustrative diagrammatic views of a container lifting system and cover lifting system positioned serially to disassemble a container system, showing the container system prior to disassembly (FIG. 22A), and showing the container system following disassembly (FIG. 22B)
Figure 22B:
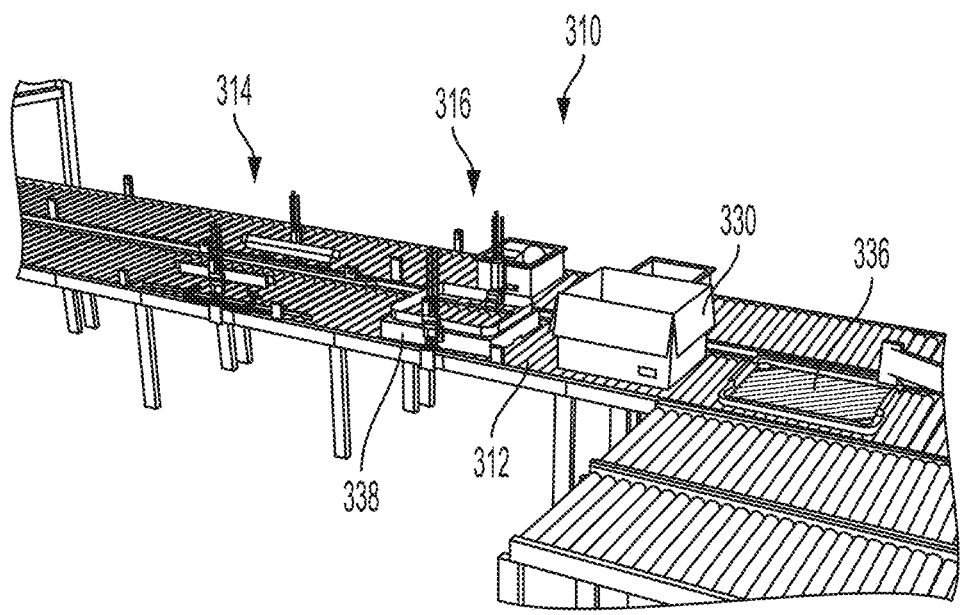
Figure 23A:
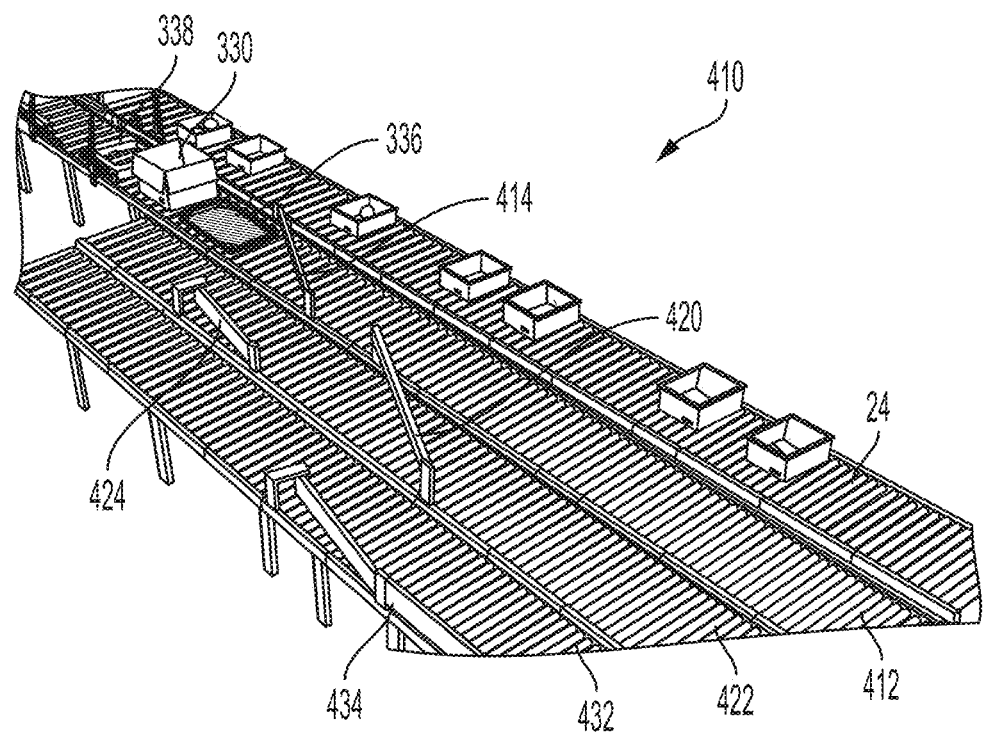
FIGS. 23A-23D show illustrative diagrammatic views of a disassembled container system being separated by diverters and conveyors, showing the components entering the system (FIG. 23A), separating the tray (FIG. 23B), separating the container from the cover (FIG. 23C), and providing the components on separate conveyors (FIG. 23D)
Figure 23B:
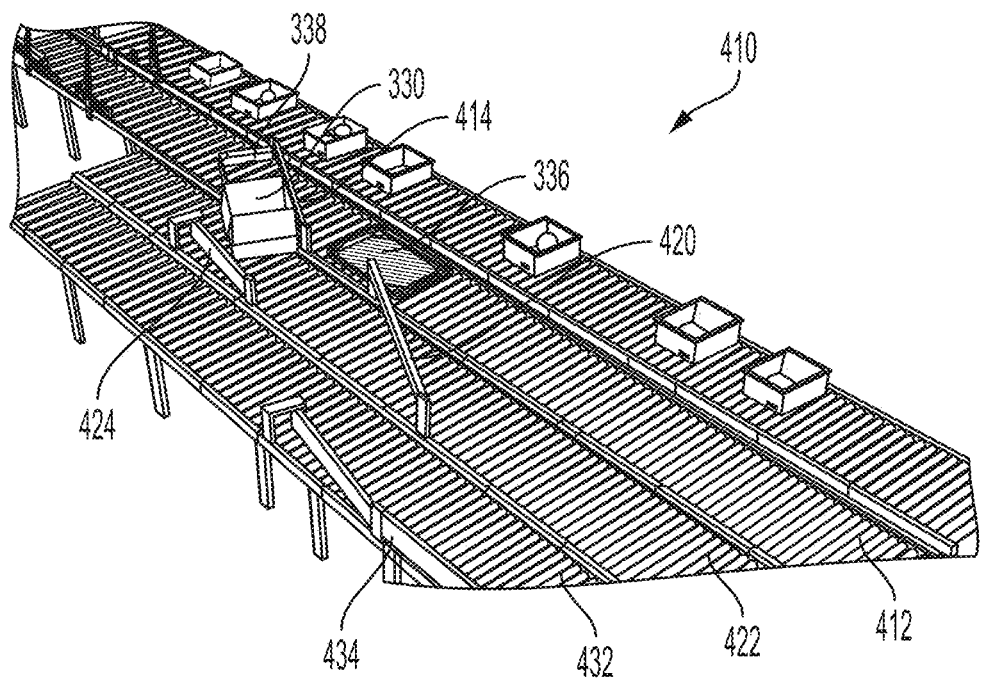
Figure 23C:
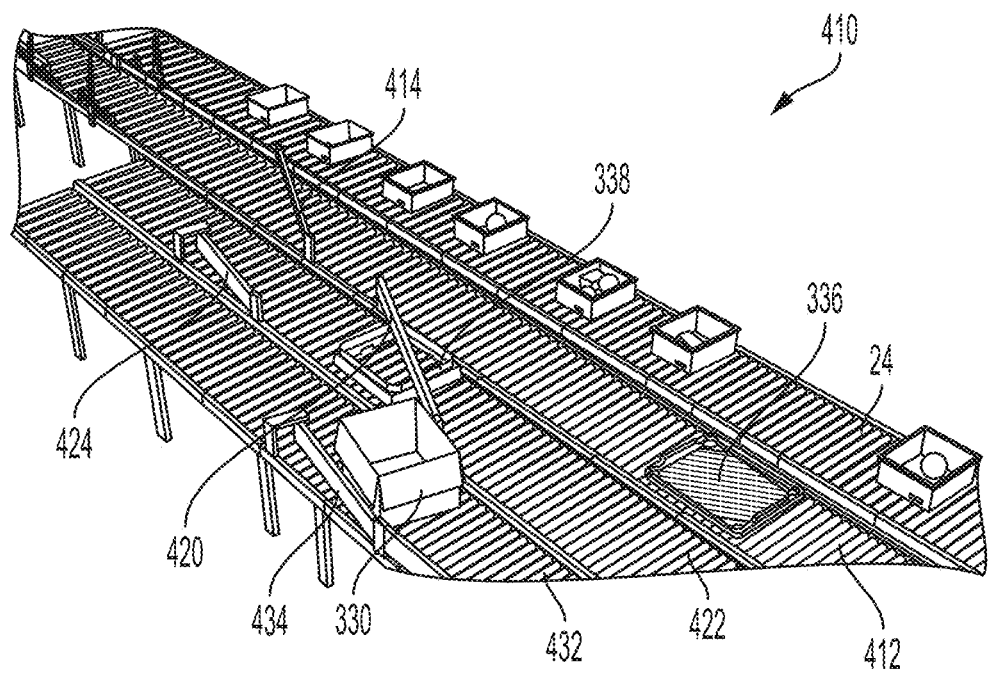
Figure 23D:
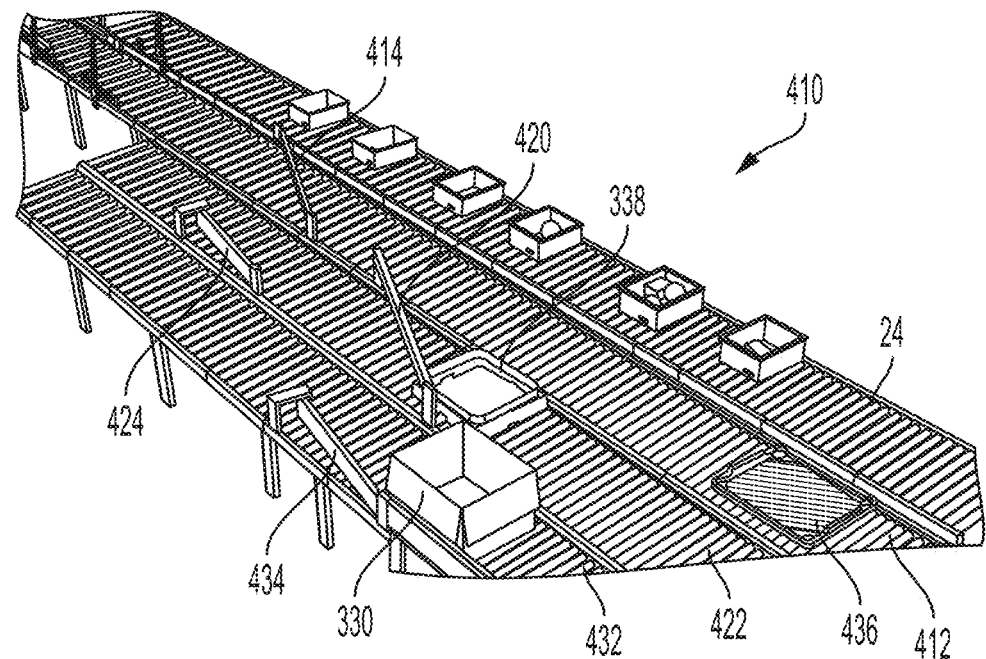

At an exit portion of the processing system, a container de-assembly system 310 may be provided that includes a container lifting system 314 followed by a collar lifting system 316 as shown in FIG. 22A. A container assembly including a container 330, carrier 336 and collar 338 first enters the container lifting system 314 where the container and collar are separated from the carrier 336. The carrier 136 passes through the collar lifting system 316. The container and collar then enter the collar lifting system 316, where the collar is separated from the container. The carrier 336, then container 330 and finally collar 138 are then provided as de-assembled on the conveyor 312 as shown in FIG. 22B.

With further reference to FIGS. 23A-23D, a conveyor separation system 410 may be provided that separates the carriers from the collars and from the containers. In particular, the carriers, containers and collars contact a first divider 414 (see FIG. 23A) that permits the carriers to pass onto a conveyor 412 (see FIG. 23B) while containers and collars are diverted by the first divider 414 to conveyor 422 (due to a height restriction on the first divider 414 that is high enough to pass the carriers but not the containers or collars). A second divider 420 permits the collars to pass along the conveyor 422 (see FIG. 23C) while containers are again diverted by the second divider 420 onto conveyor 432 (due to a height restriction on the second divider 420 that is high enough to pass the collars but not the containers) (see FIG. 23D). Carriers are therefore provided on conveyor 412, collars are provided on conveyor 422, and containers are provided on conveyor 33. Re-alignment rails 424, 434 may facilitate realignment of objects on each respective conveyor 422 and 432. Again, the collars and the carriers may be recirculated to the input of the processing system.

Figure 24:
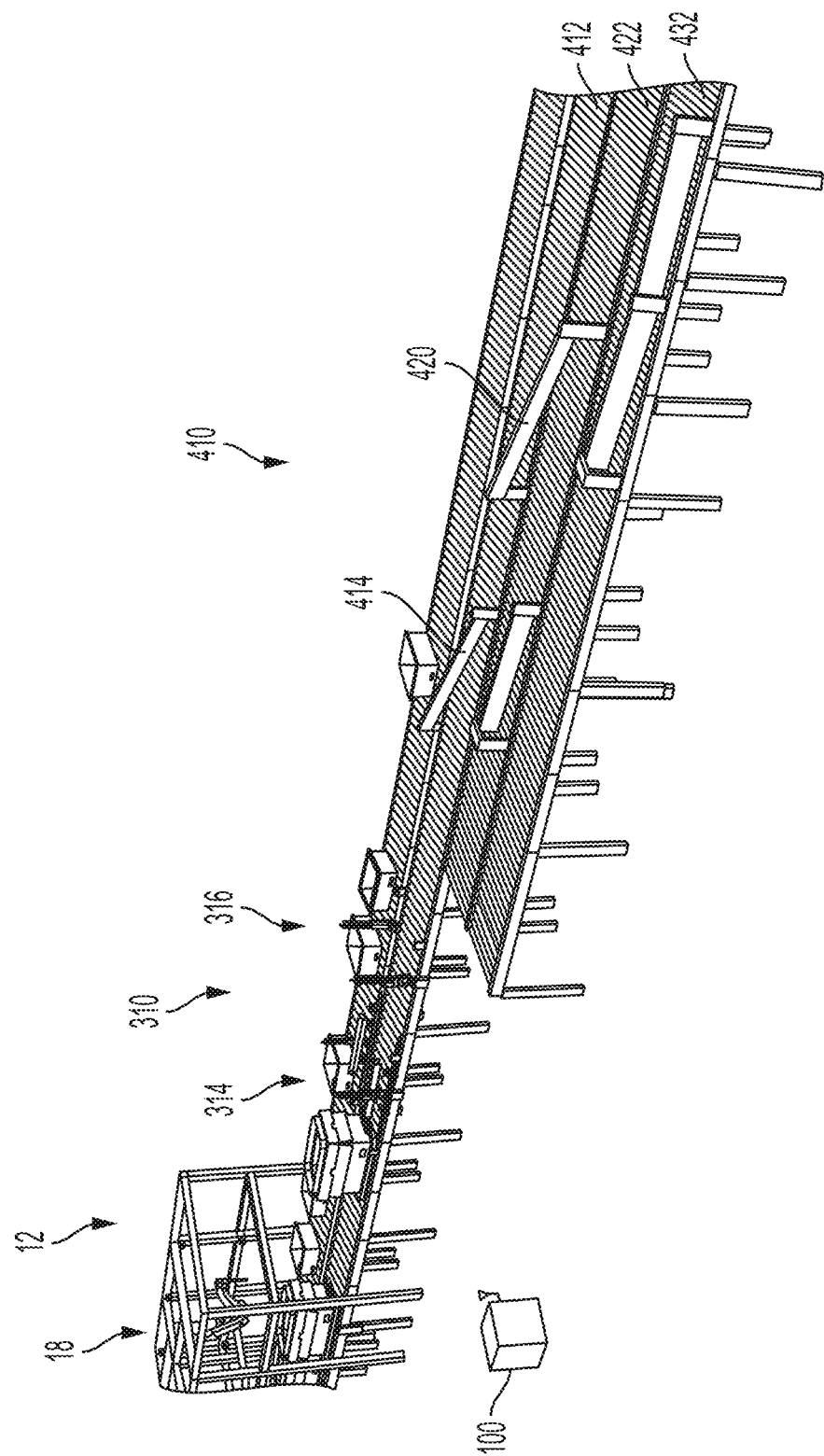
FIG. 24 shows an illustrative diagrammatic view of the container assembly separation system for use in accordance an aspect of the present invention.

With reference again to FIG. 1 and with reference to FIG. 24, the system 12 may include, in addition to the processing system 18, a container de-assembly system 310 with container lifting system 314 and collar lifting system 316, as well as a conveyor separation system 410 with first and second dividers 314, 320 that separate the carriers, collars and containers onto conveyors 412, 414, 416.

Figure 25:
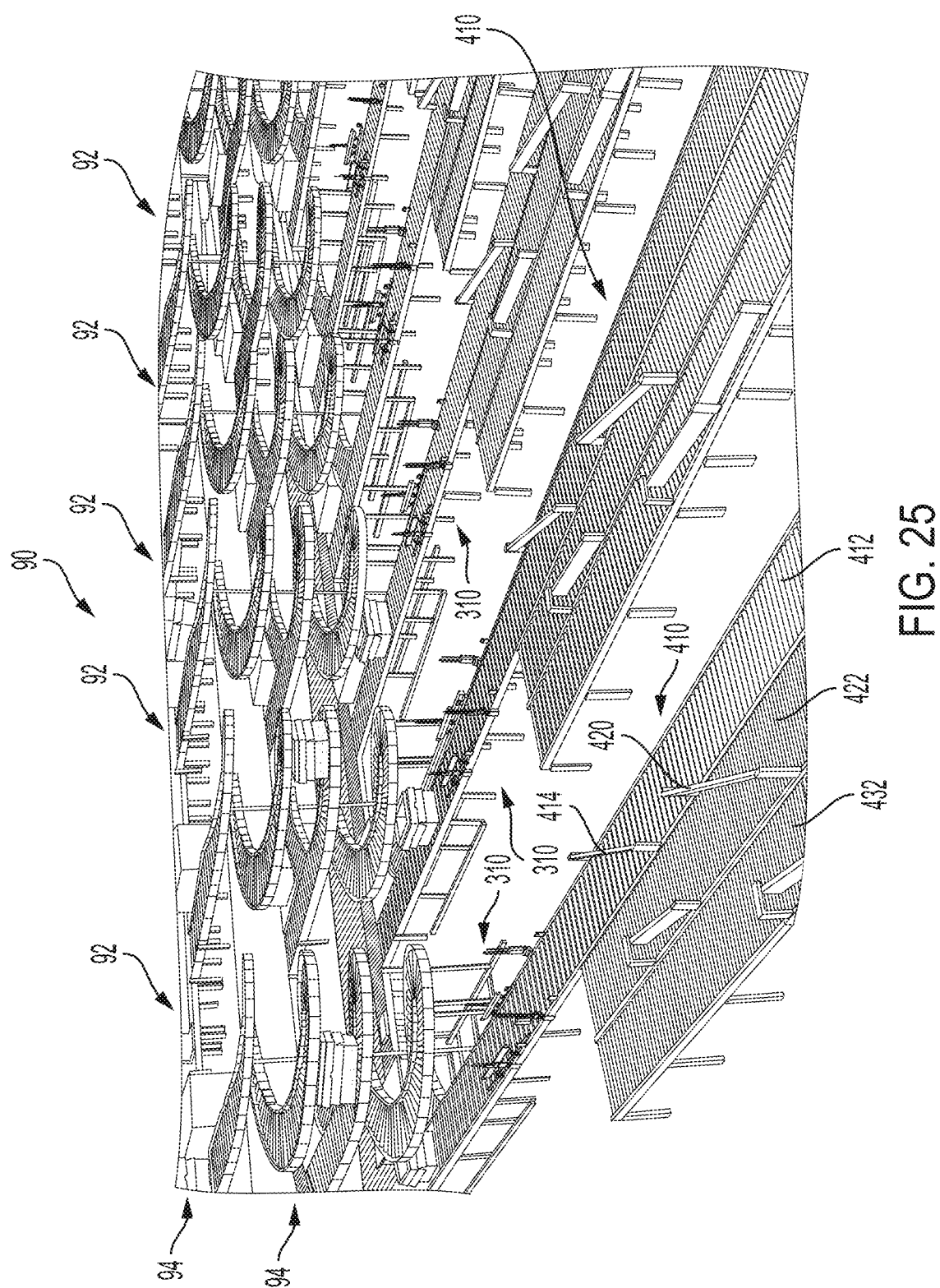
FIG. 25 shows an illustrative diagrammatic view of an object processing system in accordance with a further aspect of the present invention that include multiple levels of processing, using the conveyor trays to facilitate merging and collection of the objects.

With reference to FIG. 6 and with further reference to FIG. 25, the system 90 may also include, in addition to the helical conveyor section 92 and processing levels 94, a container de-assembly system 310 with container lifting system 314 and collar lifting system 316, as well as a conveyor separation system 410 with first and second dividers 314, 320 that separate the carriers, collars and containers onto conveyors 412, 414, 416.

Those skilled in the art will appreciate that numerous modifications and variations may be made to the above disclosed embodiments without departing from the spirit and scope of the present invention.

What is claimed is:

1. A container assembly processing system for assembling and de-assembling container assemblies comprising:
   a plurality of carriers, containers and collars, wherein the carriers carry the containers and the containers carry the collars when assembled to form the container assemblies;
   a conveyor system on which the container assemblies are assembled and de-assembled;
   a container lifting system comprising two container lifting assemblies positioned on opposite sides of the conveyor system, wherein the two container lifting assemblies are configured to lift a container of the plurality of containers vertically from a carrier of the plurality of carriers on the conveyor system; and
   a collar lifting system comprising two collar engagement systems positioned on opposite sides of the conveyor system, wherein the two collar engagement systems are configured to lift a collar of the plurality of collars vertically from the container on the conveyor system, wherein the collar is configured to engage at least one closure flap of the container to maintain the container in an open configuration.

2. The container assembly processing system as claimed in claim 1, wherein each container lifting assembly is configured to lift the container by the at least one closure flap of the container.

3. The container assembly processing system as claimed in claim 2, wherein each container lifting assembly includes a V-shaped channel structure for capturing an outer edge of the at least one closure flap.

4. The container assembly processing system as claimed in claim 3, wherein each container lifting assembly further includes a flap support portion for inhibiting buckling of the at least one closure flap during lifting of the container.

5. The container assembly processing system as claimed in claim 4, wherein each container lifting assembly includes a linear actuator assembly that travels vertically along a main shaft.

6. The container assembly processing system as claimed in claim 5, wherein the linear actuator assembly of each container lifting assembly raises the flap support portion and V-shaped channel structure to lift the container from the carrier.

7. The container assembly processing system as claimed in claim 5, wherein the linear actuatory assembly is an electric motor or a hydraulic system.

8. The container assembly processing system as claimed in claim 5, where the linear actuator assembly is prevented from rotating by guide rods.

9. The container assembly processing system as claimed in 3, wherein the V-shaped channel structure of each container lifting assembly includes guide plates that facilitate entry of the outer edge of the at least one closure flap into the area of the V-shaped channel structure.

10. The container assembly processing system as claimed in claim 3, wherein the at least one closure flap is in compression when the container is lifted by the two container lifting assemblies.

11. The container assembly processing system as claimed in claim 1, wherein each collar engagement system engages a recess of the collar prior to lifting the collar from the container.

12. The container assembly processing system as claimed in claim 11, wherein each collar engagement system includes an L-shaped structure configured to pivot for engaging the recess of the collar.

13. The container assembly processing system as claimed in claim 12, wherein the recess is an underside of a handle of the collar.

14. The container assembly processing system as claimed in claim 1, wherein the container lifting system includes a lateral offset mechanism for facilitating engaging the container.

15. The container assembly processing system as claimed in claim 1, wherein each collar engagement system is attached to a collar actuator assembly that travels vertically along a main shaft as guided by guide rods.

16. The container assembly processing system as claimed in claim 1, wherein each container lifting assembly includes a carrier alignment rail for aligning the carrier between the two container lifting assemblies.

17. The container assembly processing system as claimed in claim 16, wherein the carrier alignment rail is mounted on an actuatable mount that is adjustable to accommodate a size of the carrier on the conveyor system.

18. The container assembly processing system as claimed in claim 1, wherein each container lifting assembly includes a container alignment plate for aligning the container between the two container lifting assemblies.

19. The container assembly processing system as claimed in claim 18, wherein the container alignment plate is mounted on an actuatable mount that is adjustable to accommodate a size of the container on the conveyor system.

20. The container assembly processing system as claimed in claim 1 wherein the conveyor includes a weight sensing section to confirm at least one of the presence of a container and the presence of a formed container assembly.

21. A container assembly processing system for assembling and de-assembling container assemblies comprising:
a plurality of carriers, containers and collars, wherein the carriers carry the containers and the containers carry the collars when assembled to form the container assemblies;
a conveyor system on which the container assemblies are assembled and de-assembled; and
a container lifting system comprising two container lifting assemblies positioned on opposite sides of the conveyor system, wherein the two container lifting assemblies are configured to lift a container of the plurality of containers vertically from a carrier of the plurality of carriers on the conveyor system, and wherein each container lifting assembly includes a V-shaped channel structure for capturing an outer edge of at least one closure flap of the container.

22. The container assembly processing system as claimed in claim 21, wherein each container lifting assembly further includes a flap support portion for inhibiting buckling of least one closure flap during lifting of the container.

23. The container assembly processing system as claimed in claim 22, wherein each container lifting assembly includes a linear actuator assembly that travels vertically along a main shaft.

24. The container assembly processing system as claimed in claim 23, wherein the linear actuator assembly of each container lifting assembly raises the flap support portion and V-shaped channel structure to lift the container from the carrier.

25. A container assembly processing system for assembling and de-assembling container assemblies comprising:
a plurality of carriers, containers and collars, wherein the carriers carry the containers and the containers carry the collars when assembled to form the container assemblies;
a conveyor system on which the container assemblies are assembled and de-assembled; and
a collar lifting system comprising two collar engagement systems positioned on opposite sides of the conveyor system, wherein the two collar engagement systems are configured to lift a collar of the plurality of collars vertically from the container on the conveyor system by engaging a recess of the collar prior to lifting the collar from the container, wherein the collar is configured to engage at least one closure flap of the container to maintain the container in an open configuration.

26. The container assembly processing system as claimed in claim 25, wherein each collar engagement system includes an L-shaped structure for engaging each respective recess on the collar.

* * * * *